(12) United States Patent
Wang et al.

(10) Patent No.: US 10,609,619 B2
(45) Date of Patent: Mar. 31, 2020

(54) CELL SELECTION PROCEDURES FOR MACHINE TYPE COMMUNICATION DEVICES

(71) Applicant: QUALCOMM Incorporated, San Diego, CA (US)

(72) Inventors: Renqiu Wang, San Diego, CA (US); Madhavan Srinivasan Vajapeyam, San Diego, CA (US); Hao Xu, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/154,349

(22) Filed: Oct. 8, 2018

(65) Prior Publication Data
US 2019/0045420 A1     Feb. 7, 2019

Related U.S. Application Data

(63) Continuation of application No. 15/148,818, filed on May 6, 2016, now Pat. No. 10,117,152.
(Continued)

(51) Int. Cl.
*H04W 36/36* (2009.01)
*H04W 4/70* (2018.01)
(Continued)

(52) U.S. Cl.
CPC ............ *H04W 36/36* (2013.01); *H04H 20/38* (2013.01); *H04L 5/005* (2013.01); *H04W 4/70* (2018.02);
(Continued)

(58) Field of Classification Search
CPC ... H04W 4/70; H04W 36/0083; H04W 36/36; H04W 72/0406; H04W 36/0094
See application file for complete search history.

(56) References Cited

U.S. PATENT DOCUMENTS 10,117,152 B2 * 10/2018 Wang ..................... H04W 4/70
2013/0130682 A1    5/2013 Awad et al.
(Continued)

FOREIGN PATENT DOCUMENTS

EP          2750456 A1     7/2014
JP       2015005847 A     1/2015
(Continued)

OTHER PUBLICATIONS

CATT: "Discussion on Cell Selection for CE mode", 3GPP TSG RAN WG2 Meeting #89bis, R2-151212, 3rd Generation Partnership Project (3GPP), val. RAN WG2, no. Bratislava, Slovakia; Apr. 20, 2015-Apr. 24, 2015, Apr. 19, 2015 (Apr. 19, 2015), XP050936172, 3 pages. Retrieved from the Internet: URL: http://www.3gpp.org/ftp/Meetings_3GPP_SYNC/RAN2/Docs/ [retrieved on Apr. 19, 2015].
(Continued)

*Primary Examiner* — Diane D Mizrahi
(74) *Attorney, Agent, or Firm* — Holland & Hart LLP

(57) ABSTRACT

Cell selection techniques are provided for network access to cells that may employ one or more coverage enhancement techniques. A user equipment (UE), which may be a machine type communication (MTC) device, upon initial acquisition or upon wakeup may measure a reference signal received power (RSRP), reference signal received quality (RSRQ), or both, and determine a cell selection value based at least in part on the RSRP, RSRQ, or a combination thereof. The cell selection value may be determined based on an offset, which may be selected based on a measurement accuracy capability of the UE. UE sequential access attempts, neighbor cell list information that may include
(Continued)

coverage enhancement of neighboring cells transmissions, and cell re-selection measurement frequency adjustments are also described.

34 Claims, 15 Drawing Sheets

Related U.S. Application Data

(60) Provisional application No. 62/161,117, filed on May 13, 2015.

(51) Int. Cl.
*H04W 48/20* (2009.01)
*H04H 20/38* (2008.01)
*H04L 5/00* (2006.01)
*H04W 36/00* (2009.01)
*H04W 72/04* (2009.01)
*H04W 72/08* (2009.01)

(52) U.S. Cl.
CPC ....... *H04W 36/0083* (2013.01); *H04W 48/20* (2013.01); *H04W 72/0473* (2013.01); *H04W 72/085* (2013.01)

(56) References Cited

U.S. PATENT DOCUMENTS

| | | | |
|---|---|---|---|
| 2014/0098761 | A1 | 4/2014 | Lee et al. |
| 2016/0337889 | A1 | 11/2016 | Jung et al. |
| 2016/0360452 | A1 | 12/2016 | Koorapaty et al. |
| 2017/0013551 | A1 | 1/2017 | Martin |
| 2017/0135005 | A1 | 5/2017 | Basu et al. |

FOREIGN PATENT DOCUMENTS

| | | |
|---|---|---|
| WO | WO-2014077766 A1 | 5/2014 |
| WO | WO-2014169939 A1 | 10/2014 |
| WO | 2015012654 A1 | 1/2015 |

OTHER PUBLICATIONS

Alcatel-Lucent Shanghai Bell., et al., "Consideration on idle mode MTC UE in Enhanced coverage", 3GPP DRAFT; R2-140729,3rd Generation Partnership, Project T3GPP), Mobile Competence Centre; 650, Route Des Lucioles; F-06921, vol. RAN WG2, no. Prague, Czech Republic; Feb. 10, 2014-Feb. 14, 2014, Feb. 9, 2014 (Feb. 9, 2014). XP050737268, 3 pages. Retrieved from the Internet: URL: http://www.3gpp.org/ftp/Meetings_3GPP_SYNC/RAN/RAN2/Docs/.
Boixadera F., et al., "Radio Resource Management" In: "LTE—The UMTS Long Term Evolution", John Wiley & Sons, Ltd, Chichester, UK, XP055109635, Chapter 13,Feb. 20, 2009, pp. 301-321. ISBN: 978-0-47-069716-0, DOI: 10.1002/9780470742891.
International Search Report and Written Opinion—PCT/US2016/031510—ISA/EPO—Oct. 26, 2016 (153569WO).
Sony: "Cell Selection and Reselection for Enhanced Coverage", 3GPP TSG-RAN WG2 Meeting #89, R2-150185, 3<sup>RD</sup> Generation Partnership Project (3GPP), val. RAN WG2, no. Athens, Greece; Feb. 9, 2015-Feb. 13, 2015, Feb. 8, 2015 (Feb. 8, 2015), XP050935531, 6 pages. Retrieved from the Internet: URL: http://www.3gpp.org/ftp/Meetings_3GPP_SYNC/RAN2/Docs/ [retrieved on Feb. 8, 2015].
Ericsson: "MIB for Rel-13 low Complexity and Coverage Enhanced UEs", 3GPP TSG-RAN WG2 #89bis; R2-151552, 3rd Generation Partnership Project (3GPP), val. RAN WG2, no. Bratislava, Slovakia; Apr. 20, 2015-Apr. 24, 2015, Apr. 19, 2015 (Apr. 19, 2015), XP050936467, 3 pages. Retrieved from the Internet: URL: http://www.3gpp.org/ftp/Meetings_3GPP_SYNC/RAN2/Docs/ [retrieved on Apr. 19, 2015].
Qualcomm Incorporated: "Idle mode mobility support for Rel.13 eMTC", 3GPP TSG-RAN WG2 Meeting #90, R2-152709, 3rd Generation Partnership Project (3GPP), Mobile Competence Centre; 650, Route Des Lucioles; F-06921 Sophia-Antipolis Cedex; France, vol. RAN WG2, no. Fukuoka, Japan; May 25, 2015-May 29, 2015, May 24, 2015 (May 24, 2015), XP050973072, 3 pages. Retrieved from the Internet: URL: http://www.3gpp.org/ftp/Meetings_3GPP_SYNC/RAN2/Docs/- - [retrieved on May 24, 2015].
Ericsson: "Mobility Support for low Complexity UEs and UEs in Enhanced coverage", 3GPP TSG-RAN WG2 #89, R2-150464, 3<sup>RD</sup> Generation Partnership Project (3GPP), val. RAN WG2, no. Athens, Greece; Feb. 9, 2015-Feb. 13, 2015, Feb. 8, 2015 (Feb. 8, 2015), XP050935719, 3 pages. Retrieved from the Internet: URL: http://www.3gpp.org/ftp/Meetings_3GPP_SYNC/RAN2/Docs/ [retrieved on Feb. 8, 2015].
CATT: "Discussion on mobility support for Low Complexity MTC UEs and MTC coverage enhancement" [online], 3GPP TSG-RAN WG2#84, R2-134040, Nov. 15, 2013, Section2.1.1, 5 Pages, Internet URL:http://www.3gpp.org/ftp/tsg_ran/WG2_RL2/TSGR2_84/Docs/R2-134040.zip.
Sony: "Cell Selection and Reselection for Enhanced Coverage" [online], 3GPP TSGRAN WG2#89bis, R2-151079, Apr. 24, 2015, Section2.2, 7 Pages, Internet URL:http://www.3gpp.org/ftp/tsg_ran/WG2_RL2/TSGR2_89bis/Docs/R2-151079.zip. .

\* cited by examiner

CELL SELECTION PROCEDURES FOR MACHINE TYPE COMMUNICATION DEVICES

CROSS REFERENCES

The present Application is a continuation of U.S. patent application Ser. No. 15/148,818 by Wang, et al., entitled, "Cell Selection Procedures For Machine Type Communication Devices" filed May 6, 2016, which claims priority to U.S. Provisional Patent Application No. 62/161,117 by Wang et al., entitled "Cell Selection Procedure for MTC Devices," filed May 13, 2015, assigned to the assignee hereof.

BACKGROUND

The following relates generally to wireless communication, and more specifically to cell selection procedure for machine type communication (MTC) devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some types of wireless devices may provide for automated communication. Automated wireless devices may include those implementing Machine-to-Machine (M2M) communication or MTC. M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some wireless communications systems employing MTC, various coverage enhancement techniques may be employed to enhance the likelihood of successful transmissions for MTC devices with relatively poor coverage for network communications. Such coverage enhancement techniques may provide higher transmission power, redundant transmissions of data, or combinations thereof. Network nodes that use coverage enhancement techniques for transmissions thus have higher likelihood of successful transmissions than may be the case if the node were to transmit without coverage enhancement techniques. However, when a UE initially accesses a network, it may not be known which network nodes may use coverage enhancement techniques. Thus, a node having a lower received signal strength than another node may in fact provide better service due to coverage enhancement that a node with a higher received signal strength that does not use coverage enhancement.

SUMMARY

The described features generally relate to one or more systems, methods, and apparatuses for cell selection for machine type communication (MTC) devices. Cell selection may account for, or be based on, one or more coverage enhancement techniques employed by a cell. A device may identify a measurement accuracy capability of a user equipment (UE). The device may determine an offset to apply to a cell selection value based on the measurement accuracy capability of the UE. One or more signal parameters of signals received from a cell may be measured at a UE, and a cell selection value for the cell may be determined based on signal parameters and the offset. A cell may be selected for network access based on the cell selection value. In some examples, a cell selection parameter for two or more cells may be less than a threshold value for cell selection, and a UE may sequentially attempt access to cells based on a reference signal received power (RSRP) value and/or a reference signal received quality (RSRQ) value. In certain examples, a cell may provide signaling indicative of a coverage enhancement level for one or more cells, which may be used for subsequent cell selection by a UE. In further examples, upon establishment of a connection at a cell, a UE may reduce a frequency of cell reselection measurements based on a use of coverage enhancement techniques of one or more of the cells.

A method of wireless communication in a wireless communications network is described. The method may include identifying a measurement accuracy capability of a UE, determining an offset to apply to a cell selection value based at least in part on the measurement accuracy capability of the UE, measuring one or more signal parameters of signals received from a cell, and determining the cell selection value for the cell based at least in part on the one or more signal parameters and the offset.

An apparatus for wireless communication in a wireless communications network is described. The apparatus may include means for identifying a measurement accuracy capability of a UE, means for determining an offset to apply to a cell selection value based at least in part on the measurement accuracy capability of the UE, means for measuring one or more signal parameters of signals received from a cell, and means for determining the cell selection value for the cell based at least in part on the one or more signal parameters and the offset.

A further apparatus for wireless communication in a wireless communications network is described. The apparatus may include a processor, memory in electronic communication with the processor, and instructions stored in the memory, wherein the instructions are executable by the processor to identify a measurement accuracy capability of a UE, determine an offset to apply to a cell selection value based at least in part on the measurement accuracy capability of the UE, measure one or more signal parameters of signals received from a cell, and determine the cell selection value for the cell based at least in part on the one or more signal parameters and the offset.

A non-transitory computer-readable medium storing code for wireless communication in a wireless communications network is described. The code may include instructions executable to identify a measurement accuracy capability of a UE, determine an offset to apply to a cell selection value based at least in part on the measurement accuracy capability of the UE, measure one or more signal parameters of signals received from a cell, and determine the cell selection value for the cell based at least in part on the one or more signal parameters and the offset.

Some examples of the method, apparatuses, or non-transitory computer-readable medium described above may further include determining one or more other cell selection values for one or more other cells based at least in part on one or more other measured signal parameters of the other cells and the offset, and selecting a cell for attempting access to the wireless communications network based at least in part on the cell selection value for the cells. Additionally or alternatively, in some examples the cell selection value is based at least in part on one or more of a RSRP measurement or a RSRQ measurement.

In some examples of the method, apparatuses, or non-transitory computer-readable medium described above, the measurement accuracy capability of the UE is determined based at least in part on a hardware or software capability of the UE. Additionally or alternatively, in some examples the offset is a predefined offset value based at least in part on the measurement accuracy capability of the UE. In some examples of the method, apparatuses, or non-transitory computer-readable medium described above, the offset is signaled to the UE by the cell. Additionally or alternatively, in some examples the offset is selected from a plurality of available offset values associated with different measurement accuracy capabilities. In some examples of the method, apparatuses, or non-transitory computer-readable medium described above, the offset is determined to be a first offset value when the measurement accuracy capability of the UE meets or exceeds a threshold and is determined to be a second offset value when the measurement accuracy capability of the UE is less than the threshold, and wherein the first offset value is less than the second offset value.

A method of wireless communication in a wireless communications network is described. The method may include measuring one or more signal parameters of signals received from two or more cells, determining that a cell selection parameter for the two or more cells is less than a threshold value for cell selection, selecting a first cell of the two or more cells for attempting access to the wireless communications network based at least in part on the cell selection parameter, and continuing to select remaining cells of the two or more cells for attempting access to the wireless communications network according to a predefined criteria.

An apparatus for wireless communication in a wireless communications network is described. The apparatus may include means for measuring one or more signal parameters of signals received from two or more cells, means for determining that a cell selection parameter for the two or more cells is less than a threshold value for cell selection, means for selecting a first cell of the two or more cells for attempting access to the wireless communications network based at least in part on the cell selection parameter, and means for continuing to select remaining cells of the two or more cells for attempting access to the wireless communications network according to a predefined criteria.

A further apparatus for wireless communication in a wireless communications network is described. The apparatus may include a processor, memory in electronic communication with the processor, and instructions stored in the memory, wherein the instructions are executable by the processor to measure one or more signal parameters of signals received from two or more cells, determine that a cell selection parameter for the two or more cells is less than a threshold value for cell selection, select a first cell of the two or more cells for attempting access to the wireless communications network based at least in part on the cell selection parameter, and continue to select remaining cells of the two or more cells for attempting access to the wireless communications network according to a predefined criteria.

A non-transitory computer-readable medium storing code for wireless communication in a wireless communications network is described. The code may include instructions executable to measure one or more signal parameters of signals received from two or more cells, determine that a cell selection parameter for the two or more cells is less than a threshold value for cell selection, select a first cell of the two or more cells for attempting access to the wireless communications network based at least in part on the cell selection parameter, and continue to select remaining cells of the two or more cells for attempting access to the wireless communications network according to a predefined criteria.

In some examples of the method, apparatuses, or non-transitory computer-readable medium described above, the continuing to select remaining cells comprises attempting to decode a broadcast channel transmission of the first cell, and selecting a second cell of the two or more cells for attempting access to the wireless communications network based at least in part on unsuccessfully attempting to decode the broadcast channel transmission of the first cell. Additionally or alternatively, in some examples the attempting to decode the broadcast channel transmission of the first cell comprises attempting to decode a physical broadcast channel (PBCH) and system information block (SIB) of the first cell.

In some examples of the method, apparatuses, or non-transitory computer-readable medium described above, the attempting to decode the broadcast channel transmission comprises determining that the first cell has coverage enhancement, and attempting to decode the broadcast channel transmission of the first cell with bundling support based at least in part on the determination. Additionally or alternatively, some examples may include determining an order for selecting the two or more cells for attempting access based at least in part on a receive power level for the two or more cells, wherein the cell selection parameter for the two or more cells comprises the receive power level.

In some examples of the method, apparatuses, or non-transitory computer-readable medium described above, the cell selection parameter is determined based at least in part on one or more of a RSRP measurement or a RSRQ measurement for the two or more cells. Additionally or alternatively, in some examples the selecting the first cell of the two or more cells comprises determining that one or more of the RSRP or RSRQ value of the first cell exceeds the corresponding RSRP or RSRQ value of a second cell.

Some examples of the method, apparatuses, or non-transitory computer-readable medium described above may further include receiving an indication of a coverage enhancement level of the two or more cells.

A method of wireless communication in a wireless communications network is described. The method may include receiving signaling indicative of a coverage enhancement level for one or more cells, combining the coverage enhancement levels with receive power information for the one or more cells, and selecting a cell for network access based at least in part on a cell selection parameter comprising the combined coverage enhancement levels and receive power information.

An apparatus for wireless communication in a wireless communications network is described. The apparatus may include means for receiving signaling indicative of a coverage enhancement level for one or more cells, means for combining the coverage enhancement levels with receive power information for the one or more cells, and means for selecting a cell for network access based at least in part on a cell selection parameter comprising the combined coverage enhancement levels and receive power information.

A further apparatus for wireless communication in a wireless communications network is described. The apparatus may include a processor, memory in electronic communication with the processor, and instructions stored in the memory, wherein the instructions are executable by the processor to receive signaling indicative of a coverage enhancement level for one or more cells, combine the coverage enhancement levels with receive power information for the one or more cells, and select a cell for network access based at least in part on a cell selection parameter comprising the combined coverage enhancement levels and receive power information.

A non-transitory computer-readable medium storing code for wireless communication at a wireless device is described. The code may include instructions executable to receive signaling indicative of a coverage enhancement level for one or more cells, combine the coverage enhancement levels with receive power information for the one or more cells, and select a cell for network access based at least in part on a cell selection parameter comprising the combined coverage enhancement levels and receive power information.

In some examples of the method, apparatuses, or non-transitory computer-readable medium described above, the combining further comprises determining an offset to apply to cell selection values for the one or more cells based at least in part on a coverage enhancement level for the one or more cells. Additionally or alternatively, in some cases the one or more cells may include one or both of a serving cell or a neighboring cell. Additionally or alternatively, in some examples the cell selection parameter is based at least in part on one or both of a RSRP measurement or a RSRQ measurement.

In some examples of the method, apparatuses, or non-transitory computer-readable medium described above, selecting the cell for network access comprises determining that a cell selection parameter for candidate cells is less than a threshold value for cell selection. Additionally or alternatively, in some examples selecting the cell for network access comprises continuing to select additional cells for network access according to a predefined criteria.

In some examples of the method, apparatuses, or non-transitory computer-readable medium described above, continuing to select additional cells comprises attempting to decode a broadcast channel transmission of the cell, and selecting a second cell of the one or more cells for access to the wireless communications network based at least in part on unsuccessfully attempting to decode the broadcast channel transmission of the cell. Additionally or alternatively, some examples may include determining that a reference signal density for a cell of the one or more cells is adjusted based at least in part on the coverage enhancement level for the cell, and adjusting a measurement duration associated with the reference signal based at least in part on the reference signal density.

In some examples of the method, apparatuses, or non-transitory computer-readable medium described above, the reference signal density is increased as a function of the coverage enhancement level. Additionally or alternatively, in some examples the measurement duration associated with the reference signal is increased as a function of the coverage enhancement level.

A method of wireless communication in a wireless communications network is described. The method may include establishing a connection with a first cell in the wireless communications network, and reducing a frequency of measurements of one or more other cells based at least in part on a use of coverage enhancement techniques of one or both of the first cell or the one or more other cells.

An apparatus for wireless communication in a wireless communications network is described. The apparatus may include means for establishing a connection with a first cell in the wireless communications network, and means for reducing a frequency of measurements of one or more other cells based at least in part on a use of coverage enhancement techniques of one or both of the first cell or the one or more other cells.

A further apparatus for wireless communication in a wireless communications network is described. The apparatus may include a processor, memory in electronic communication with the processor, and instructions stored in the memory, wherein the instructions are executable by the processor to establish a connection with a first cell in the wireless communications network, and reduce a frequency of measurements of one or more other cells based at least in part on a use of coverage enhancement techniques of one or both of the first cell or the one or more other cells.

A non-transitory computer-readable medium storing code for wireless communication in a wireless communications network is described. The code may include instructions executable to establish a connection with a first cell in the wireless communications network, and reduce a frequency of measurements of one or more other cells based at least in part on a use of coverage enhancement techniques of one or both of the first cell or the one or more other cells.

Some examples of the method, apparatuses, or non-transitory computer-readable medium described above may further include measuring one or more signal parameters of signals received from the one or more other cells according to the reduced frequency of measurements, and determining whether to attempt to establish a connection with a second cell of the one or more other cells based at least in part on the measured signal parameters for the second cell and a coverage enhancement level associated with the first cell and the second cell. Additionally or alternatively, in some examples reducing the frequency of measurements comprises identifying a coverage enhancement level associated with the first cell, adjusting a cell selection criteria for the first cell based at least in part on the coverage enhancement level associated with the first cell, and configuring a timer to control the frequency of measurements of signals received from the one or more other cells having at least partially overlapping frequencies based at least in part on the adjusted cell selection criteria.

In some examples of the method, apparatuses, or non-transitory computer-readable medium described above, reducing the frequency of measurements comprises identifying a coverage enhancement level associated with the first cell, identifying one or more of the other cells having non-overlapping frequencies with the first cell, and adjusting the frequency of measurements for one or more of the other cells based at least in part on a priority associated with the non-overlapping frequencies of the one or more other cells. Additionally or alternatively, in some examples measurements for one or more of the other cells having a higher priority frequency are performed based at least in part on one or both of a timer or a quality threshold of the first cell.

In some examples of the method, apparatuses, or non-transitory computer-readable medium described above, measurements for one or more of the other cells having a lower priority frequency are performed based at least in part on one or both of a timer or an offset to a cell selection criteria associated with the first cell.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
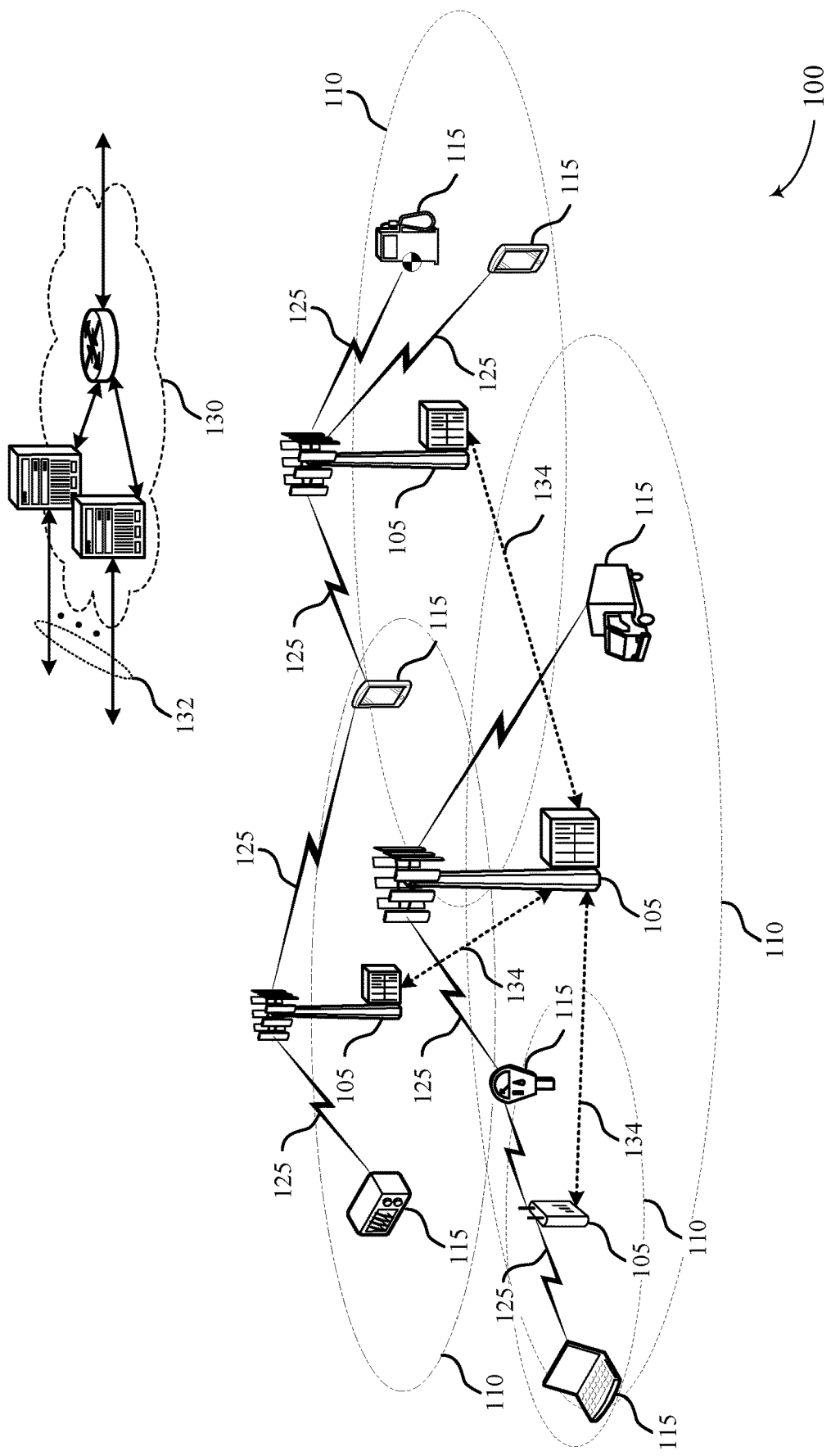
FIG. 1 illustrates an example of a wireless communications system that supports cell selection procedures for MTC in accordance with various aspects of the present disclosure.

The described features generally relate to improved systems, methods, or apparatuses for cell selection for access to a wireless communications network for Machine Type Communication (MTC) devices. In some examples, cell selection techniques are provided for network access to cells that may employ one or more coverage enhancement techniques. A user equipment (UE), which may be an MTC device, upon initial acquisition or upon wakeup may measure a reference signal received power (RSRP), reference signal received quality (RSRQ), or both, and determine a cell selection value based at least in part on the RSRP, RSRQ, or a combination thereof. In certain examples, the cell selection value may be determined based on an offset. The offset may be selected based on a measurement accuracy capability of the UE (e.g., hardware or software capabilities of the UE for measuring received signals). In some examples, a UE may sequentially attempt access to one or more cells until a cell with adequate coverage enhancement is found, and in which an initial cell for an access attempt may be selected based on RSRP, RSRQ, or a combination thereof. In other examples, a cell may transmit information related to coverage enhancement used by cells in a neighbor cell list, and coverage enhancement levels may be combined with RSRP, RSRQ, or a combination thereof, to determine a cell selection value for use in selecting a cell for attempting network access. In still further examples, when a connection is established between a UE and a cell, the UE may reduce a frequency of measurements for cell reselection operations based at least in part on a use of coverage enhancement techniques.

Such techniques, as will be discussed in more detail below, may be desirable in deployments of MTC devices. As mentioned above, some wireless systems may provide for automated communication such as MTC or Machine-to-Machine (M2M) communication. M2M or MTC may refer to technologies that communicate without human intervention. In some cases, MTC devices may have limited capabilities. For example, while some MTC devices may have broadband capacity, other MTC devices may be limited to narrowband communications. This narrowband limitation may, for example, interfere with the ability of an MTC device to receive control channel information or transmitted reference signals using the full bandwidth served by a base station. In some wireless communication systems, such as those employing Long Term Evolution (LTE) techniques, an MTC device having limited bandwidth capability (or another device with similar capabilities) may be referred to as a category 0 device.

In some cases, MTC devices may have reduced peak data rates (e.g., a maximum transport block size may be 1000 bits). Additionally, an MTC device may have rank one transmission and one antenna for receiving. This may limit an MTC device to half-duplex communication (e.g., the device may not be capable of simultaneously transmitting and receiving). If an MTC device is half-duplex, it may have relaxed switching time (e.g., from transmission (Tx) to reception (Rx) or vice versa). For example, a nominal switching time for a non-MTC device may be 20 μs while a switching time for an MTC device may be 1 ms. MTC enhancements (eMTC) in a wireless system may allow narrowband MTC devices to effectively operate within wider system bandwidth operations (e.g., 1.4/3/5/10/15/20 MHz). For example, an MTC device may support 1.4 MHz bandwidth (e.g., 6 resources blocks in an LTE system). In some instances, coverage enhancements of such MTC devices may be employed to provide more reliable communications. Coverage enhancements may include, for example, power boosting (e.g., of up to 15 dB), and bundling of transmission time intervals (TTIs) to provide redundant versions of a transmission.

Bundling of TTIs to provide a certain number of redundant versions of a transmission may be used to enhance coverage for certain channels, such as the physical uplink shared channel (PUSCH), the physical downlink shared channel (PDSCH), an enhanced PDCCH (ePDCCH), the physical random access channel (PRACH), the physical uplink control channel (PUCCH), or the like. For instance, various physical channels—including the PRACH and associated messages—may have multiple redundant transmissions from a wireless communications device. In some cases, the number of redundant versions can be on the order of tens of subframes; and different channels may have different redundancy levels.

When performing initial acquisition or upon waking up a UE, such as a MTC UE, may perform one or both of RSRP or RSRQ measurements for use in selecting a cell for initiating network access. However, as mentioned above, in order to provide more reliable coverage for certain MTC devices, a cell may use coverage enhancements. In some network deployments, as much 15 dB coverage enhancements are supported, which maps to 155.7 dB maximum coupling loss between the UE and a base station. This may result in the UE and base station performing measurements, such as RSRP and RSRQ measurements, at relatively low SNR, e.g. from −15 dB to −20 dB. At such SNR levels, there may be a relatively high likelihood for measurement error, such that a measured RSRP or RSRQ may not be representative of the actual RSRP or RSRQ for a device.

Additionally, in some deployments, a cell specific reference signal (CRS) may be used to measure RSRP/RSRQ, but CRS may not be bundled in transmissions from a cell that uses coverage enhancement techniques. Thus, a CRS-based RSRP/RSRQ measurement may not reflect coverage enhancement information. As a result, a RSRP/RSRQ based cell selection might not select the correct cell, because a cell with a low RSRP/RSRQ result, but with coverage enhancement, might be better than a cell with a higher RSRP/RSRQ, but without coverage enhancement.

Various aspects, as will be discussed in more detail below, provide techniques for cell selection for MTC devices that may communicate using coverage enhancements. In some examples an offset may be determined for a UE based on a measurement accuracy capability of the UE, and which may be used in determining a cell selection value for two or more potential serving cells and selecting a cell for an initial network access attempt. As noted above, MTC devices may have limited capabilities for receiving transmissions, and in some cases may further be located in areas that have poor coverage (e.g., in a basement of a building). The RSRP measurements at a UE may thus be compensated, to provide a cell selection value for use in cell selection.

For example, in some deployments MTC devices may have RSRP measurement signal to noise ratios of +/−7 dB in normal conditions and up to +/−10 dB in extreme conditions. Furthermore, due to hardware limitations of certain MTC devices, software limitations of certain MTC devices, or a combination thereof, certain MTC devices may have relatively low measurement accuracy capabilities. Thus, in such examples, an RSRP measurement at a UE may not be accurate enough to provide a meaningful cell access selection value. For example, a probability density function (PDF) associated with an RSRP measurement having a relatively high signal to noise ratio (e.g., a 0 dB SNR) may have a may be relatively sharp and narrow, while a PDF associated with an RSRP measurement having a relatively low SNR (e.g., a −10 dB or −15 dB SNR) may be relatively low and wide, such that substantial overlap of probabilities for different SNRs may be present. RSRQ measurements may have similar characteristics.

In cases where cell selection for initial network access is based on RSRP/RSRQ, as mentioned above, relatively low SNR measurements may result in an inaccurate selection of a cell for initial network access. In some examples, a set of offset values to a cell selection value be provided to a UE, with one of the offset values selected based on an RSRP/RSRQ measurement and a UE measurement accuracy capability, as will be discussed in more detail below. In some cases, a UE may sequentially attempt access to cells until a cell with suitable coverage enhancements is discovered, may receive coverage enhancement information for neighbor cells from a serving cell, may adjust a cell reselection measurement frequency, or combinations thereof.

Although coverage enhancement techniques—including redundant transmissions and power boosting—and related cell selection based on such techniques may be employed with MTC devices, other types of UE may likewise utilize or benefit from such techniques. Accordingly, those skilled in the art will recognize that the described coverage enhancement and cell selection techniques are not limited to MTC uses.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a MTC device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, as mentioned above, wireless communications system 100 may utilize coverage enhancement (CE) techniques to improve the quality of a communication link 125 for UEs 115 located at a cell edge, operating with low power transceivers, or experiencing high interference or path loss. CE techniques may include repeated transmissions, transmission time interval (TTI) bundling, hybrid automatic repeat request (HARQ) retransmission, physical uplink shared channel (PUSCH) hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. This may be effective for users engaging in voice over Long Term evolution (VoLTE) or VOIP communications. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.).

A base station 105 may insert periodic pilot symbols such as cell-specific reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. UEs 115 may use CRS for RSRP or RSRQ measurements, which may be used in cell selection for initial network access or when a UE 115 wakes up. As mentioned above, CRS may not be bundled in transmissions from a cell that uses CE techniques, and thus a CRS based RSRP/RSRQ measurement does not reflect CE information. As a result, a RSRP/RSRQ based cell selection might not select the correct cell, because a cell with low RSRP result but with coverage enhancement might be better than a cell with a slightly higher RSRP but without coverage enhancement.

In cases where cell selection for initial network access is based on RSRP/RSRQ, as mentioned above, relatively low SNR measurements may result in an inaccurate selection of a cell for initial network access. In some examples, a set of offset values to a cell selection value be provided to a UE, with one of the offset values selected based on an RSRP/RSRQ measurement and a UE measurement accuracy capability, as will be discussed in more detail below. In some cases, a UE may sequentially attempt access to cells until a cell with suitable coverage enhancements is discovered, may receive coverage enhancement information for neighbor cells from a serving cell, may adjust a cell reselection measurement frequency, or combinations thereof.

Figure 2:
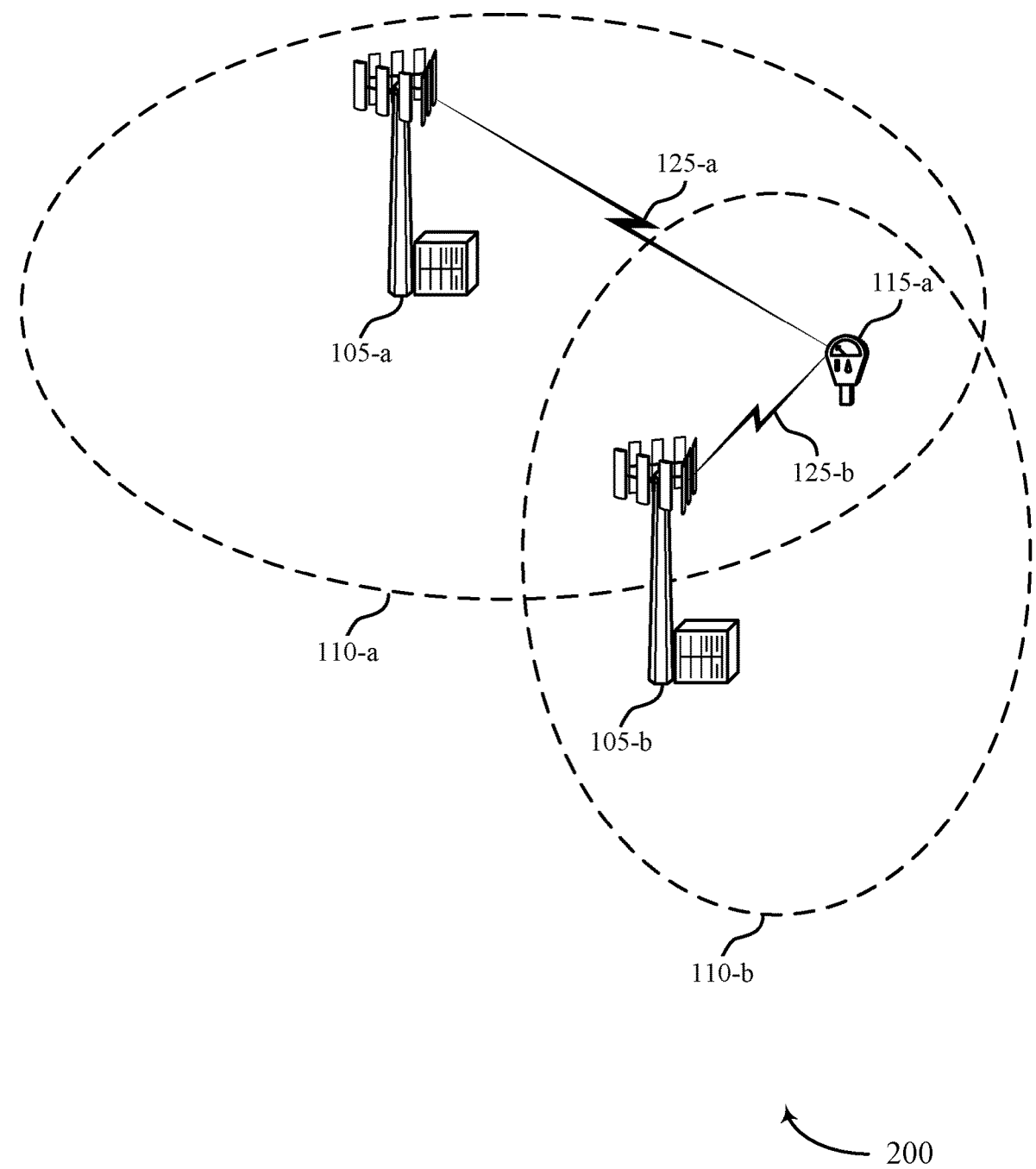
FIG. 2 illustrates an example of a wireless communications subsystem that supports cell selection procedures for MTC in accordance with various aspects of the present disclosure.

FIG. 2 illustrates an example of a wireless communications subsystem 200 that supports cell selection procedures for MTC in accordance with various aspects of the present disclosure. Wireless communications subsystem 200 may include a UE 115-a, base station 105-a, and base station 105-b, which may be examples of a UE 115 base station 105 described with reference to FIG. 1. For example, as illustrated, UE 115-a may be an MTC device. Each base station 105-a and 105-b may communicate with UE 115-a via communication links 125-a and 125-b, respectively. The communication links 125 may transmit a CRS, which may be used to measure RSRP/RSRQ, to any UE 115-a within respective geographic coverage area 110-a and 110-b. Communication link 125-a may allow for bidirectional communication between a UE 115-a and a base station 105-a.

As mentioned, a CRS transmitted by each base station 105 may be used by UE 115-a to measure RSRP/RSRQ, which the UE 115-a may use to perform cell selection. Established cell selection techniques may include determining whether a cell selection criterion is met, and then selecting an available cell of any cell that meet the cell selection criterion. In some examples, the cell selection criterion S is fulfilled when:

$$S_{rxlev} > 0 \text{ AND } S_{qual} > 0$$

where:

$$S_{rxlev} = Q_{rxlevmeas} - (Q_{rxlevmin} + Q_{rxlevminoffset}) - P\text{compensation} - Q\text{offset}_{temp}$$

and $$S_{qual} = Q_{qualmeas} - (Q_{qualmin} + Q_{qualminoffset}) - Q\text{offset}_{temp}$$

where:
  $S_{rxlev}$ is a cell selection RX level value (dB)
  $S_{qual}$ is a cell selection quality value (dB)
  $Q\text{offset}_{temp}$ is an offset temporarily applied to a cell
  $Q_{rxlevmeas}$ is a measured cell RX level value (RSRP)
  $Q_{qualmeas}$ is a measured cell quality value (RSRQ)
  $Q_{rxlevmin}$ is a minimum required RX level in the cell (dBm)
  $Q_{qualmin}$ is a minimum required quality level in the cell (dB)
  $Q_{rxlevminoffset}$ is an offset to the signaled $Q_{rxlevmin}$ taken into account in the $S_{rxlev}$ evaluation as a result of a periodic search for a higher priority network
  $Q_{qualminoffset}$ is an offset to the signaled $Q_{qualmin}$ taken into account in the $S_{qual}$ evaluation as a result of a periodic search for a higher priority network
  Pcompensation is max(PEMAX−PPowerClass, 0) (dB)
  PEMAX is a maximum TX power level an UE may use when transmitting on the uplink in the cell (dBm), and
  PPowerClass is a maximum RF output power of the UE (dBm) according to the UE power class.

According to some examples, as discussed above, in situations where UE 115-a has limited coverage, due to hardware limitations, geographic location, or a combination thereof, there may be situations where no cell provides sufficient signal strength of quality to satisfy the S criterion as defined in some existing standards. As discussed above, coverage enhancements may be used by cells to provide sufficient signal strength or quality to support reliable communications with UE 115-a, but CRS transmissions from a cell may not employ such coverage enhancements. In such cases, according to some examples, UE 115-a may be provided with a different offset to be applied to the S criterion, such as offsets:

$$Q_{rxlevminoffset}, \text{ and } Q_{qualminoffset}$$

In some examples, the amount of the offset may be selected based on a measurement accuracy capability of the UE 115-a, which may be a function of UE 115-a hardware, software, or a combination of both. If UE 115-*a* has a relatively high accuracy capability, smaller offsets may be provided because the measured value of RSRP/RSRQ may be more trusted and the S criterion is more likely to be met based on the measured values. If UE 115-*a* has relatively low accuracy capability, higher offsets may be given and the less accurate RSRP/RSRQ values may be backed off more such that the S criterion is less likely to fail. In some examples, the different offset values may be defined in a specification, or signaled to the UE 115-*a* through semi-static or dynamic signaling.

In other examples, UE 115-*a* may sequentially select a cell of one of the base stations 105 according to RSRP/RSRQ level, and attempt network access. If network access using the selected cell fails, the UE 115-*a* may move to next cell according to RSRP/RSRQ level and attempt access again. In some examples, base stations 105 may signal coverage enhancement levels that may be decoded, and coverage enhancement techniques used to receive and decode communications. Such signaling of coverage enhancement levels may be provided, for example, in a physical broadcast channel (PBCH) which may include a one bit indication of MTC CE support, or may include a two bit indication of coverage enhancement levels, to provide two examples. More coverage enhancement information may be transmitted in other signaling, such as a system information block (SIB), for example. Using coverage enhancement, a SIB may be repeatedly transmitted according to TTI bundling techniques, for example. The UE 115-*a*, in such examples, may perform an RSRP/RSRQ measurement and calculate the S criterion. If the S criterion is met, the UE 115-*a* may simply select the cell with highest RSRP level, according to established techniques. If the S criterion is not met, the UE 115-*a* may select an available cell having a high, or the highest, RSRP/RSRQ measurements. If the selected cell is using coverage enhancement, the UE 115-*a* may be able to decode the indication of coverage enhancement and then decode the PBCH and SIB with bundling support. If the selected cell is not using coverage enhancement, or the level of coverage enhancement is not high enough, the UE 115-*a* may not be able to decode the PBCH or SIB, and may re-attempt network access using the next cell according to RSRP/RSRQ level, and this process may repeat until a cell is found or all cells are tested.

In still further examples, the UE 115-*a* may receive information from a serving cell that may include a neighbor cell list that includes coverage enhancement information for the neighbor cells. Such information may be provided, for example, in a SIB transmitted by a cell. The UE 115-*a*, when leaving idle mode and attempting network access, may use the coverage enhancement information for the neighbor cells and combine this information with RSRP/RSRQ measurements to determine an adjusted cell selection value. In some examples, the UE 115-*a* may determine the S criterion according to established techniques and determine if the S criterion is met, and select a cell according to established techniques if the S criterion is met. If the S criterion is not met, the UE 115-*a* may use the adjusted cell selection value, which may be a function of the coverage enhancement level of the cell, or may be zero if the cell does not use coverage enhancements. The UE 115-*a* may then select the cell, for example, with the highest RSRP/RSRQ value that meets the S criterion using the adjusted cell selection value.

In certain examples, a base station 105 may use additional techniques to attempt to provide a more reliable measurement of RSRP/RSRQ. For example, a base station may increase a reference signal density of the CRS (e.g., adding additional CRS tones), which may be increased as a function of coverage enhancements for the base station 105, and thus the RSRP/RSRQ may provide a more accurate representation of communications with the base station 105 using coverage enhancements. In other examples, a base station 105 may increase the allowable measurement duration (e.g., allow measurement duration to move from 200 ms to 2 seconds), which also would allow a more accurate representation of communications with the base station 105 using coverage enhancements. UE 115-*a*, in such examples, may increase the number of subframes for taking an average RSRP/RSRQ measurement, and thus the greater sample size may provide a more representative RSRP/RSRQ value, which may be used to determine a cell selection value in a similar manner as discussed above.

Once UE 115-*a* has established a connection with a base station 105 and a serving cell, the UE 115-*a* may periodically determine if a different cell would be more suitable for continued communications according to cell reselection procedures. In such procedures, the UE 115-*a* may still perform RSRP/RSRQ measurements for the serving cell as well as neighbor cells for cell reselection for better quality, or for a higher priority carrier frequency. Such cell re-selection procedures may control UE 115-*a* behavior after a connection with a cell is established. Cell re-selection procedures include multiple different modes, including intra-frequency re-selection wherein the UE 115-*a* re-selects to a cell in the same frequency as the current cell, and inter-frequency re-selection where a UE re-selects to a cell in a different frequency. Re-selection may be based on frequency priorities that are signaled to the UE 115-*a*. According to some existing re-selection techniques, UE 115-*a* may perform intra-frequency measurements when the S criterion is not met. For inter-frequency cell re-selection measurements, current procedures provide that the UE 115-*a* always measures higher priority frequencies, and may omit measuring equal or lower priority frequencies if signal receive levels/quality are above a defined threshold.

However, if coverage enhancement techniques are being used, it may be more likely that the S criterion and signal levels/quality thresholds may not be met, but that the coverage enhancements are allowing for successful communications between UE 115-*a* and a base station 105. Thus, according to some aspects of the disclosure, UE 115-*a* may reduce the number of cell re-selection measurements in order to conserve power, but still take measurements in order to have an opportunity to move to a more suitable cell. According to some examples, for intra-frequency measurements, if coverage enhancements are not being used, existing procedures may be applied, and if coverage enhancements are being used, the UE 115-*a* may reduce the number of measurements taken for cell reselection. For example, UE 115-*a* may reduce measurements through modifying the S criterion for the cell to provide an offset base on the coverage enhancement level, receiving an updated S criterion for the cell that is signaled by the cell, initiating a timer to control how often to perform intra frequency measurements when the S criterion is not satisfied, or combinations thereof. In certain examples, for inter-frequency measurements, when UE 115-*a* is not using coverage enhancement techniques, the UE 115-*a* may measure other frequencies according to existing techniques. If the UE 115-*a* is using coverage enhancement techniques, for higher priority frequencies, the UE 115-*a* may perform measurements based on a timer, based on a configured serving cell quality threshold, or a combination thereof. For equal or lower priority frequencies, the UE 115-*a* may simply not consider low priority frequencies, perform measurements based on a timer, or apply an offset to the S criterion to account for the coverage enhancements (e.g., an offset signaled by the base station or based on UE measurements). In such a manner, cell re-selection may be performed in a modified fashion to provide opportunity for UE 115-a to move to a different cell, but to also save power through reducing the quantity of measurements that would be taken according to existing techniques.

Figure 3:
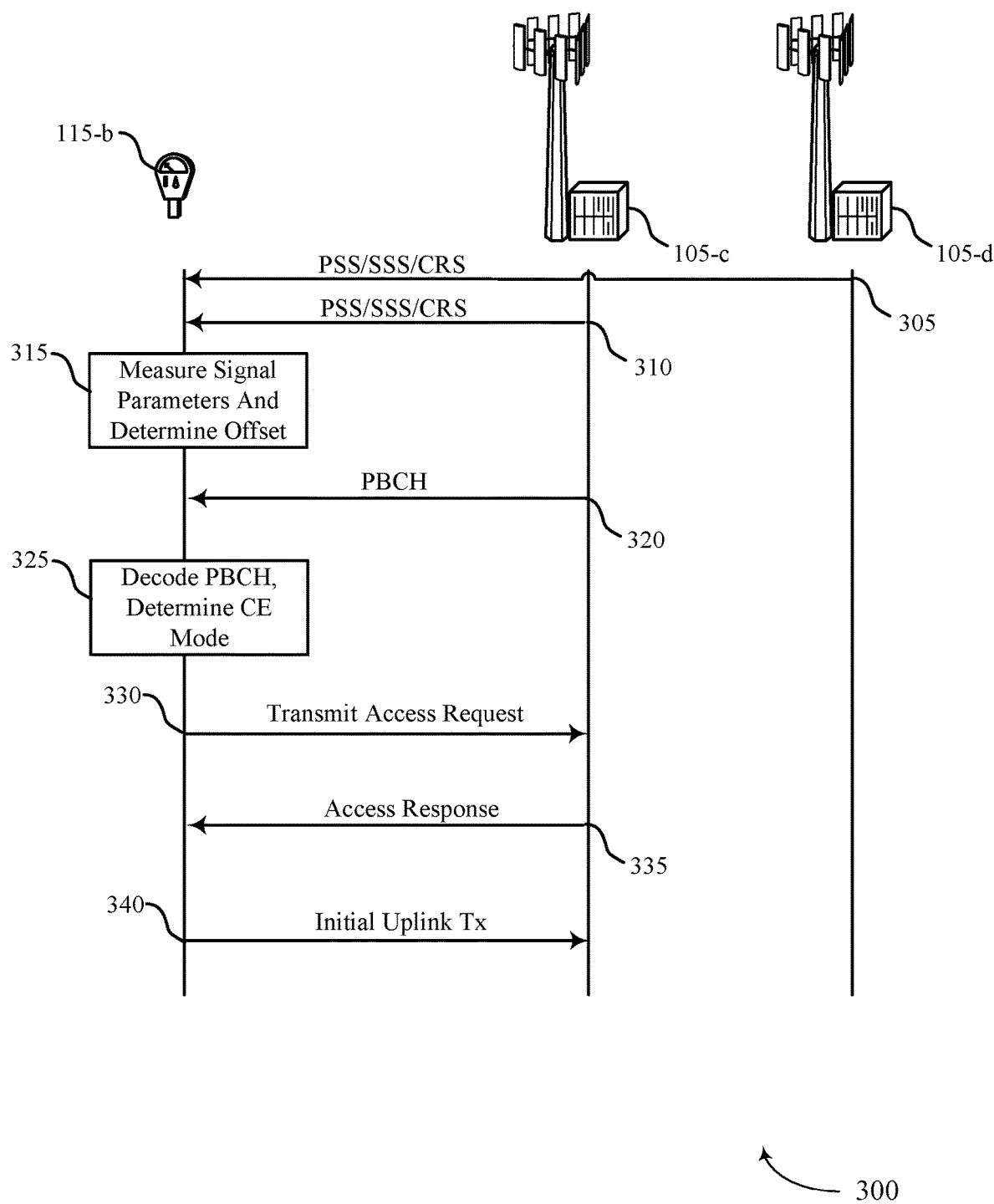
FIG. 3 illustrates an example of a call flow diagram that supports cell selection procedures for MTC in accordance with various aspects of the present disclosure.

FIG. 3 illustrates a call flow diagram 300 depicting communication within a wireless communications system according to various aspects of the present disclosure. The call flow diagram 300 may illustrate cell selection procedures for MTC in accordance with various aspects of the present disclosure, such as employed within the systems 100 or 200 of FIG. 1 or 2. The call flow diagram 300 includes a UE 115-b, a base station 105-c, and a base station 105-d, which may be examples of a UE 115 and base stations 105 of FIG. 1 or 2. The UE 115-b may be an MTC device, and the UE 115-b and one or more of base station 105-c or base station 105-d may employ coverage enhancement techniques. The call flow diagram 300 may be an example of a cell selection procedure for network access, such as a situation in which the UE 115-b is transitioning from RRC idle mode to RRC connected mode.

The UE 115-b may receive primary synchronization signal (PSS), secondary synchronization signal (SSS), and CRS signals 305 from base station 105-d, and may receive PSS/SSS/CRS 310 from base station 105-c. At block 315, the UE 115-b may measure signal parameters of the received signals and determine an offset to be applied to a cell selection value (e.g., an offset to be applied to the S criterion for a cell). Based on the measured signal parameters and the offset, the UE 115-b may determine the cell selection value for each of base station 105-c and base station 105-d. The UE 115-b may select a cell for attempting access to the wireless communications network based on the cell selection value for the cells. In the example of FIG. 3, the UE 115-b selects base station 105-c and monitors for a PBCH transmission 320 from base station 105-c. At step 325, the UE 115-b attempts to decode the received PBCH and determine a coverage enhancement mode for base station 105-c, if present. If the UE 115-b is able to successfully decode the PBCH, the UE 115-b may attempt network access using base station 105-c, and may transmit access request 330, at which point the base station 105-c may transmit access response 335 and the UE 115-b may transmit initial uplink transmission 340.

As mentioned above, in some examples the offset to be applied to the cell selection value may be identified based on a measurement accuracy capability of the UE 115-b, which may be based on a hardware capability of the UE 115-b, a software capability of the UE 115-b, or a combination thereof. In some examples the offset may be a predefined offset value based at least in part on the measurement accuracy capability of the UE 115-b. In some examples the offset is signaled to the UE 115-b. In some other examples the offset may be selected from a plurality of available offset values associated with different measurement accuracy capabilities. In certain examples the offset is determined to be a first offset value when the measurement accuracy capability of the UE 115-b meets or exceeds a threshold and is determined to be a second offset value when the measurement accuracy capability of the UE 115-b is less than the threshold, and the first offset value is less than the second offset value.

Figure 4:
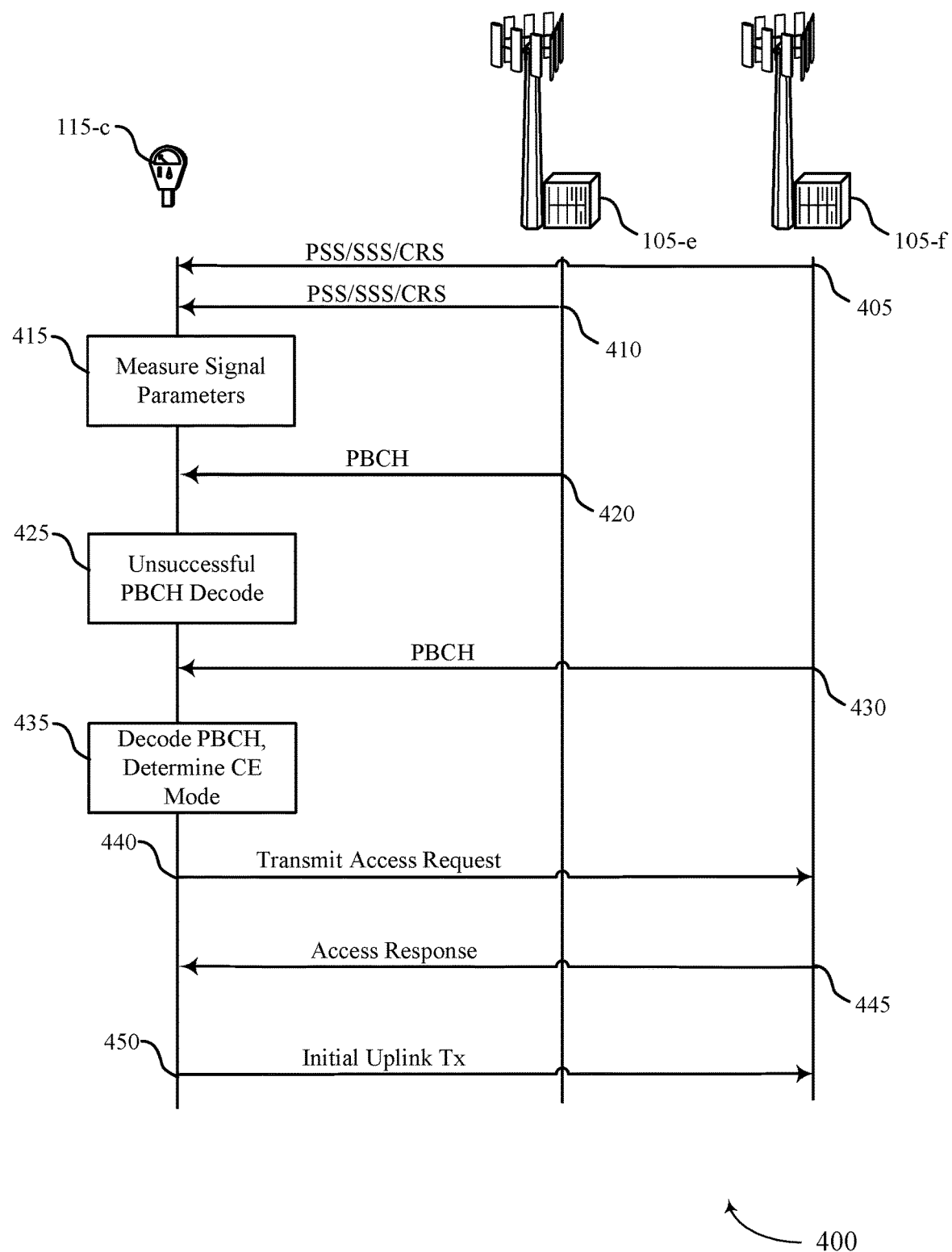
FIG. 4 illustrates an example of a call flow diagram that supports cell selection procedures for MTC in accordance with various aspects of the present disclosure.

As mentioned above, in some examples a UE may sequentially attempt to decode signals from different cells when performing cell selection for network access. FIG. 4 illustrates a call flow diagram 400 depicting communication within a wireless communications system according to various aspects of the present disclosure. The call flow diagram 400 may illustrate cell selection procedures for MTC in accordance with various aspects of the present disclosure, such as employed within the systems 100 or 200 of FIG. 1 or 2. The call flow diagram 400 includes a UE 115-c, a base station 105-e, and a base station 105-f, which may be examples of a UE 115 and base stations 105 of FIG. 1 or 2. The UE 115-c may be an MTC device; and the UE 115-c and one or more of base station 105-e or base station 105-f may employ coverage enhancement techniques. The call flow diagram 400 may be an example of a cell selection procedure for network access, such as a situation in which the UE 115-c is transitioning from RRC idle mode to RRC connected mode.

The UE 115-c may receive PSS/SSS/CRS signals 405 from base station 105-f, and may receive PSS/SSS/CRS 410 from base station 105-e. At block 415, the UE 115-c may measure signal parameters of the received signals (e.g., RSRP/RSRQ) for determination of a cell selection value (e.g., an S criterion for a cell). Based on the measured signal parameters, the UE 115-c may determine the cell selection value for each of base station 105-e and base station 105-f. The UE 115-c may select a cell for attempting access to the wireless communications network based on the cell selection value, the measured signal parameters, or a combination thereof. In the example of FIG. 4, the UE 115-c selects base station 105-e and monitors for a PBCH transmission 420 from base station 105-e. At step 425, the UE 115-c attempts to decode the received PBCH and is unsuccessful at decoding the PBCH. For example, base station 105-e may not operate using coverage enhancement techniques, such that even though a measured RSRP/RSRQ value of the base station 105-e may be higher than the measured RSRP/RSRQ value of base station 105-f, base station 105-f may provide coverage enhancement and therefore better communications. The UE 115-c may then sequentially select base station 105-f for attempting network access, and may receive a PBCH transmission 430 from base station 105-f. At block 435 the UE 115-c may decode the PBCH and determine a coverage enhancement mode for base station 105-f transmissions. If the UE 115-c is able to successfully decode the PBCH, the UE 115-c may attempt network access using base station 105-e, and may transmit access request 440, at which point the base station 105-e may transmit access response 445 and the UE 115-c may transmit initial uplink transmission 450.

In some examples, the UE 115-c may determine that a cell selection parameter for each base station 105 may be less than a threshold value for cell selection, and the initial cell selected may be based on a cell having the highest RSRP/RSRQ value. The UE 115-c may continue to select remaining cells of the two or more cells for attempting access to the wireless communications network according to a predefined criteria. In some examples the UE 115-c may continue to select remaining cells and attempt to decode the PBCH for each cell until a PBCH is successfully decoded or until all available cells are attempted. In some examples, in attempting to decode the broadcast channel transmission the UE 115-c may determine that a cell has coverage enhancement, such as through decoding one or more bits in a PBCH or SIB that indicates coverage enhancement or a level of coverage enhancement. If it is determined that coverage enhancement is present, the UE 115-*c* may attempt to decode the PBCH transmission with bundling support, based on the determination.

Figure 5:
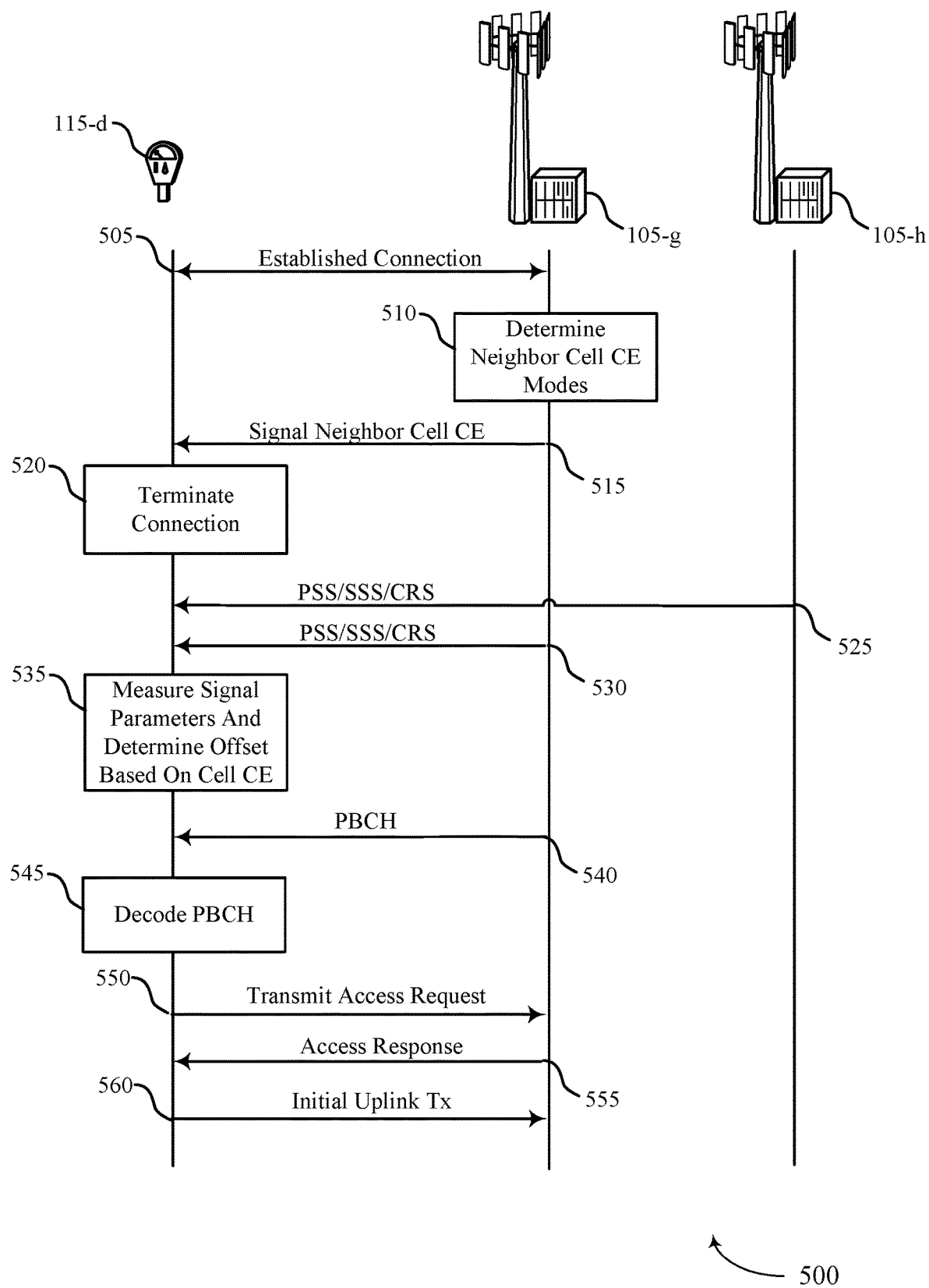
FIG. 5 illustrates an example of a call flow diagram that supports cell selection procedures for MTC in accordance with various aspects of the present disclosure.

As mentioned above, in some examples signaling may be provided that indicates coverage enhancement techniques being used by neighboring cells, which may be used for cell selection. FIG. 5 illustrates a call flow diagram 500 depicting communication within a wireless communications system according to various aspects of the present disclosure. The call flow diagram 500 may illustrate cell selection procedures for MTC in accordance with various aspects of the present disclosure, such as employed within the systems 100 or 200 of FIG. 1 or 2. The call flow diagram 500 includes a UE 115-*d*, a base station 105-*g*, and a base station 105-*h*, which may be examples of a UE 115 and base stations 105 of FIG. 1 or 2. The UE 115-*d* may be an MTC device; and the UE 115-*d* and one or more of base station 105-*g* or base station 105-*h* may employ coverage enhancement techniques. The call flow diagram 500 may be an example of a cell selection procedure for network access, such as a situation in which the UE 115-*d* is transitioning from RRC idle mode to RRC connected mode.

The UE 115-*d*, in this example, may have an established connection 505 with base station 105-*g*. Base station 105-*g* may determine coverage enhancement techniques used by one or more cells, such as neighboring cells, and may add the coverage enhancement information to a neighbor cell list, as indicated at block 510. The base station 105-*g* may transmit a signal 515 indicating the neighbor cell list and coverage enhancement. At block 520, the connection between the UE 115-*d* and base station 105-*g* is terminated (e.g., the UE 115-*d* enters idle mode). When the UE 115-*d* exits idle mode, it may receive PSS/SSS/CRS signals 525 from base station 105-*h*, and may receive PSS/SSS/CRS 530 from base station 105-*g*.

At block 535, the UE 115-*d* may measure signal parameters of the received signals (e.g., RSRP/RSRQ) and determine an offset for the cell based on the signaled coverage enhancement techniques of the cell, for determination of a cell selection value (e.g., an S criterion for a cell). Based on the measured signal parameters, the UE 115-*d* may determine the cell selection value for each of base station 105-*g* and base station 105-*h*. The UE 115-*d* may select a cell for attempting access to the wireless communications network based on the cell selection value, the measured signal parameters, or a combination thereof. In the example of FIG. 5, the UE 115-*d* selects base station 105-*g* and monitors for a PBCH transmission 540 from base station 105-*g*. At step 545, the UE 115-*d* attempts to decode the received PBCH. If the UE 115-*d* is able to successfully decode the PBCH, the UE 115-*d* may attempt network access using base station 105-*g*, and may transmit access request 550, at which point the base station 105-*g* may transmit access response 555 and the UE 115-*d* may transmit initial uplink transmission 560.

The UE 115-*d*, in some examples, may select a cell for network access based on a cell selection parameter including the combined coverage enhancement and received power information. In some examples the combining may include determining an offset for UE 115-*d* to apply to cell selection values for the neighboring cells, based at least in part on the coverage enhancement level for the respective neighboring cells. In some examples the cell selection parameter is based at least in part on one or more of a RSRP measurement or a RSRQ measurement. In some examples selecting the cell for network access may include determining that a cell selection parameter for available candidate cells is less than a threshold value for cell selection, selecting one of the candidate cells, and continuing to select additional cells for network access according to a predefined criteria, such as, for example, according to descending RSRP/RSRQ values. If the UE 115-*d* is not able to successfully decode the PBCH, neighboring base station 105-*h* may be selected for access to the wireless communications network.

Figure 6:
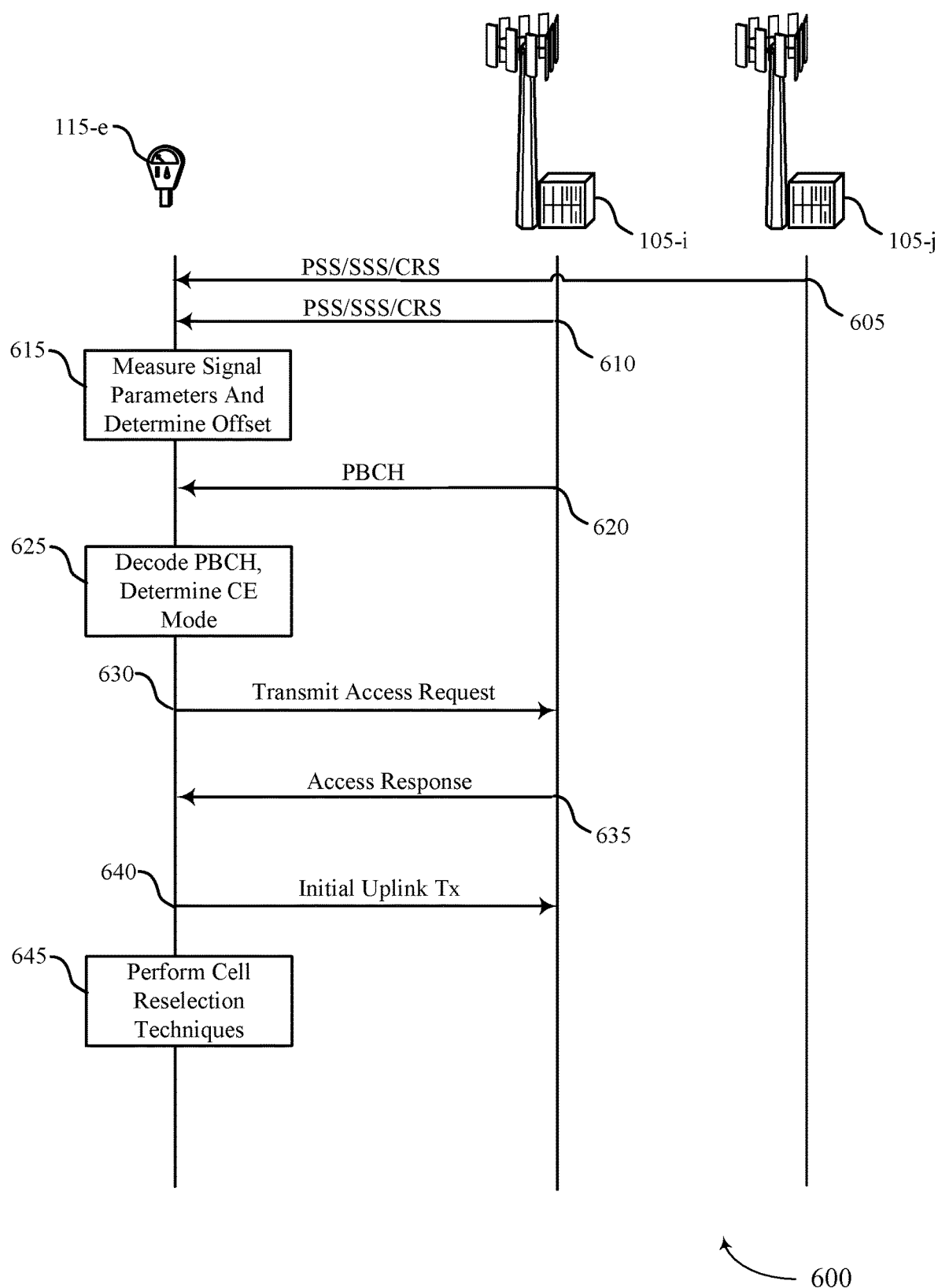
FIG. 6 illustrates an example of a call flow diagram that supports cell selection procedures for MTC in accordance with various aspects of the present disclosure.

As mentioned above, in some examples signaling may be provided that indicates coverage enhancement techniques being used by neighboring cells, which may be used for cell selection. FIG. 6 illustrates a call flow diagram 600 depicting communication within a wireless communications system according to various aspects of the present disclosure. The call flow diagram 600 may illustrate a cell re-selection procedures for MTC in accordance with various aspects of the present disclosure, such as employed within the systems 100 or 200 of FIG. 1 or 2. The call flow diagram 600 includes a UE 115-*e*, a base station 105-*i*, and a base station 105-*j*, which may be examples of a UE 115 and base stations 105 of FIG. 1 or 2. The UE 115-*e* may be an MTC device; and the UE 115-*e* and one or more of base station 105-*i* or base station 105-*j* may employ coverage enhancement techniques. The call flow diagram 600 may be an example of a cell selection procedure for network access, such as a situation in which the UE 115-*e* is transitioning from RRC idle mode to RRC connected mode.

The UE 115-*e* may receive primary synchronization signal (PSS), secondary synchronization signal (SSS), and CRS signals 605 from base station 105-*i*, and may receive PSS/SSS/CRS 610 from base station 105-*j*. At block 615, the UE 115-*e* may measure signal parameters of the received signals and determine an offset to be applied to a cell selection value (e.g., an offset to be applied to the S criterion for a cell). Based on the measured signal parameters and the offset, the UE 115-*e* may determine the cell selection value for each of base station 105-*i* and base station 105-*j*. The UE 115-*e* may select a cell for attempting access to the wireless communications network based on the cell selection value for the cells. In the example of FIG. 6, the UE 115-*e* selects base station 105-*i* and monitors for a PBCH transmission 620 from base station 105-*i*. At step 625, the UE 115-*e* attempts to decode the received PBCH and determine a coverage enhancement mode for base station 105-*i*, if present. If the UE 115-*e* is able to successfully decode the PBCH, the UE 115-*e* may attempt network access using base station 105-*i*, and may transmit access request 630, at which point the base station 105-*i* may transmit access response 635 and the UE 115-*e* may transmit initial uplink transmission 640. At block 645, the UE 115-*e* may perform cell re-selection techniques to determine if a better cell is available for communications. As discussed above, in various examples the UE 115-*e* may reduce a frequency of measurements of one or more other cells based on a use of coverage enhancement techniques of base station 105-*i*.

Figure 7:
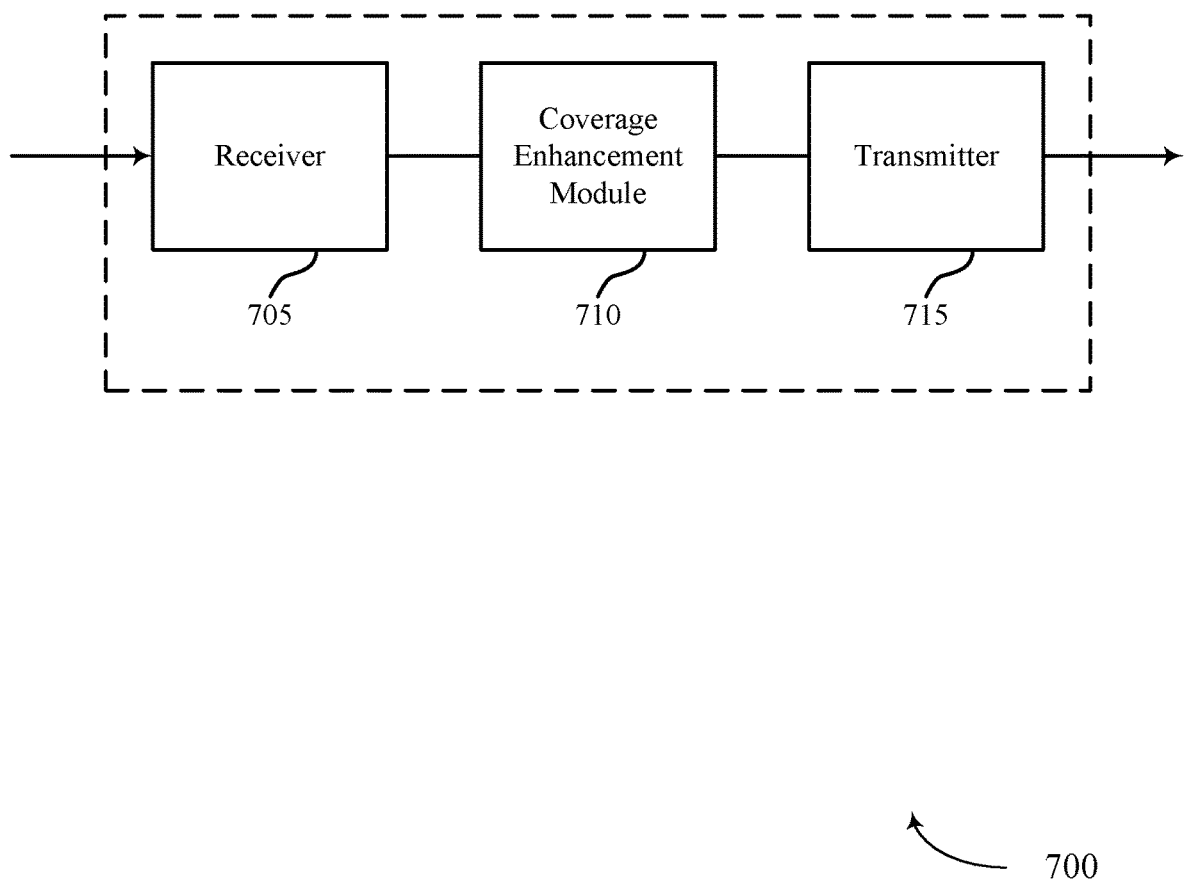
FIGS. 7-9 show diagrams of a wireless device that supports cell selection procedures for MTC in accordance with various aspects of the present disclosure.

FIG. 7 shows a diagram of a wireless device 700 configured for cell selection procedures for MTC in accordance with various aspects of the present disclosure. Wireless device 700 may be an example of aspects of a UE 115 described with reference to FIGS. 1-6. Wireless device 700 may include a receiver 705, a coverage enhancement module 710, or a transmitter 715. Wireless device 700 may also include a processor. Each of these components may be in communication with each other.

The receiver 705 may receive information such as packets, user data, or control information associated with various information channels (e.g., control channels, data channels, and information related to cell selection procedures for MTC, etc.). Information may be passed on to the coverage enhancement module 710, and to other components of wireless device 700.

The coverage enhancement module 710 may identify a measurement accuracy capability of the device, determine an offset to apply to a cell selection value based at least in part on the measurement accuracy capability of the device, measure one or more signal parameters of signals received from a cell, and determine the cell selection value for the cell based at least in part on the one or more signal parameters and the offset.

The transmitter 715 may transmit signals received from other components of wireless device 700. In some examples, the transmitter 715 may be collocated with the receiver 705 in a transceiver module. The transmitter 715 may include a single antenna, or it may include a plurality of antennas.

Figure 8:
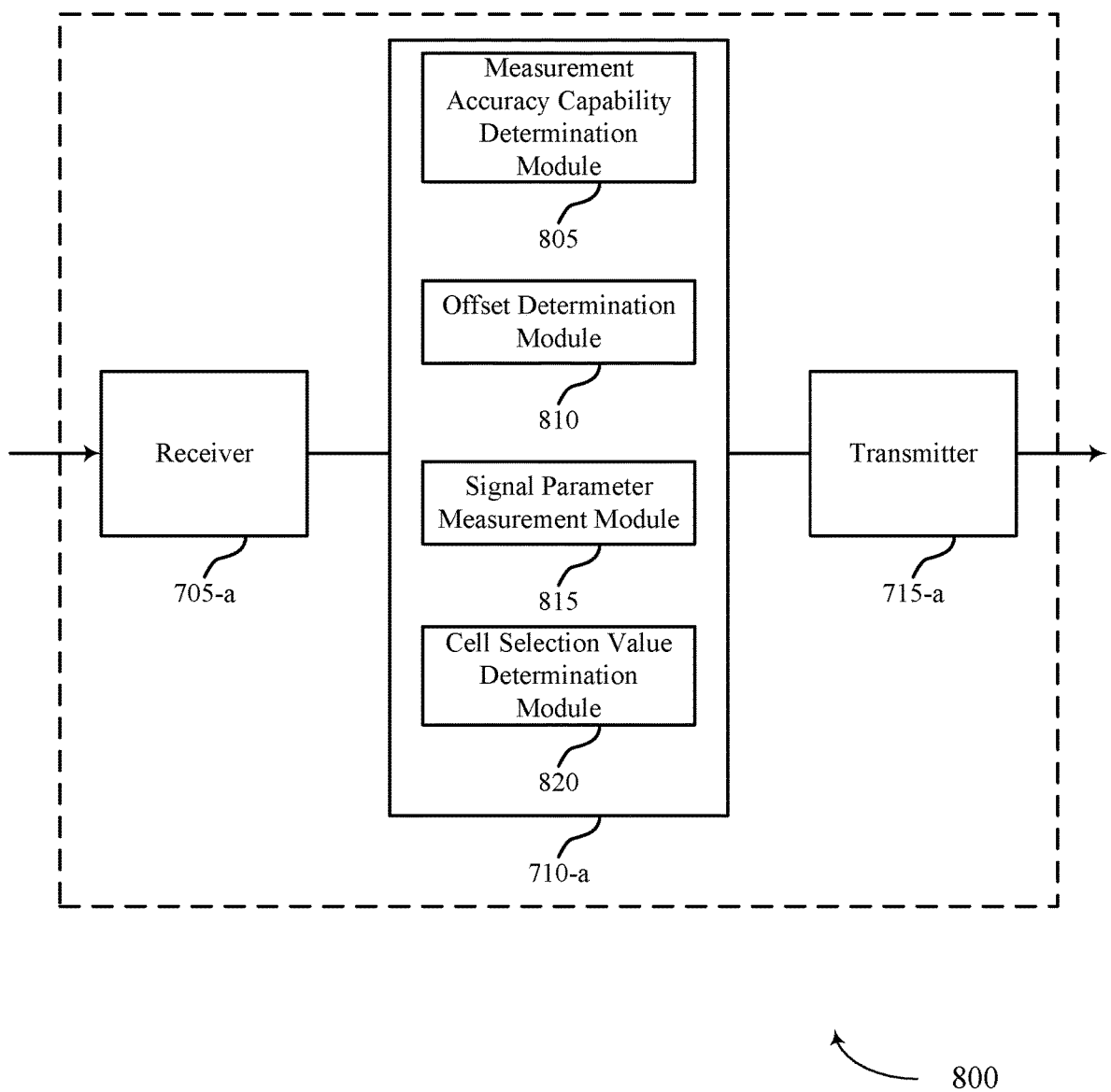

FIG. 8 shows a diagram of a wireless device 800 for cell selection procedures for MTC in accordance with various aspects of the present disclosure. Wireless device 800 may be an example of aspects of a wireless device 700 or a UE 115 described with reference to FIGS. 1-7. Wireless device 800 may include a receiver 705-a, a coverage enhancement module 710-a, or a transmitter 715-a. Wireless device 800 may also include a processor. Each of these components may be in communication with each other. The coverage enhancement module 710-a may also include a measurement accuracy capability determination module 805, an offset determination module 810, a signal parameter measurement module 815, and a cell selection value determination module 820.

The receiver 705-a may receive information which may be passed on to coverage enhancement module 710-a, and to other components of wireless device 800. The coverage enhancement module 710-a may perform the operations described with reference to FIG. 7. The transmitter 715-a may transmit signals received from other components of wireless device 800.

The measurement accuracy capability determination module 805 may identify a measurement accuracy capability of a UE as described with reference to FIGS. 2-6. In some examples, the measurement accuracy capability of the UE may be determined based at least in part on a hardware or software capability of the UE.

The offset determination module 810 may determine an offset to apply to a cell selection value based at least in part on the measurement accuracy capability of the UE as described with reference to FIGS. 2-6. In some examples, the offset may be a predefined offset value based at least in part on the measurement accuracy capability of the UE. In some examples, the offset may be signaled to the UE by the cell. In some examples, the offset may be selected from a plurality of available offset values associated with different measurement accuracy capabilities. In some examples, the offset may be determined to be a first offset value when the measurement accuracy capability of the UE meets or exceeds a threshold and may be determined to be a second offset value when the measurement accuracy capability of the UE may be less than the threshold, and wherein the first offset value may be less than the second offset value.

The signal parameter measurement module 815 may measure one or more signal parameters of signals received from a cell as described with reference to FIGS. 2-6. The signal parameter measurement module 815 may also measure one or more signal parameters of signals received from two or more cells.

The cell selection value determination module 820 may determine the cell selection value for the cell based at least in part on the one or more signal parameters and the offset as described with reference to FIGS. 2-6. The cell selection value determination module 820 may also determine one or more other cell selection values for one or more other cells based at least in part on one or more other measured signal parameters of the other cells and the offset. In some examples, the cell selection value may be based at least in part on one or more of a RSRP measurement or a RSRQ measurement. The cell selection value determination module 820 may also determine that a cell selection parameter for the two or more cells is less than a threshold value for cell selection. In some examples, the cell selection parameter may be determined based at least in part on one or more of a RSRP measurement or a RSRQ measurement for the two or more cells. The cell selection value determination module 820 may also receive an indication of a coverage enhancement level of the two or more cells. The cell selection value determination module 820 may also combine the coverage enhancement levels with receive power information for one or more neighboring cells. In some examples, the combining further comprises determining an offset to apply to cell selection values for the one or more neighboring cells based at least in part on a coverage enhancement level for the one or more neighboring cells. In some examples, the cell selection parameter may be based at least in part on one or more of a RSRP measurement or a RSRQ measurement.

Figure 9:
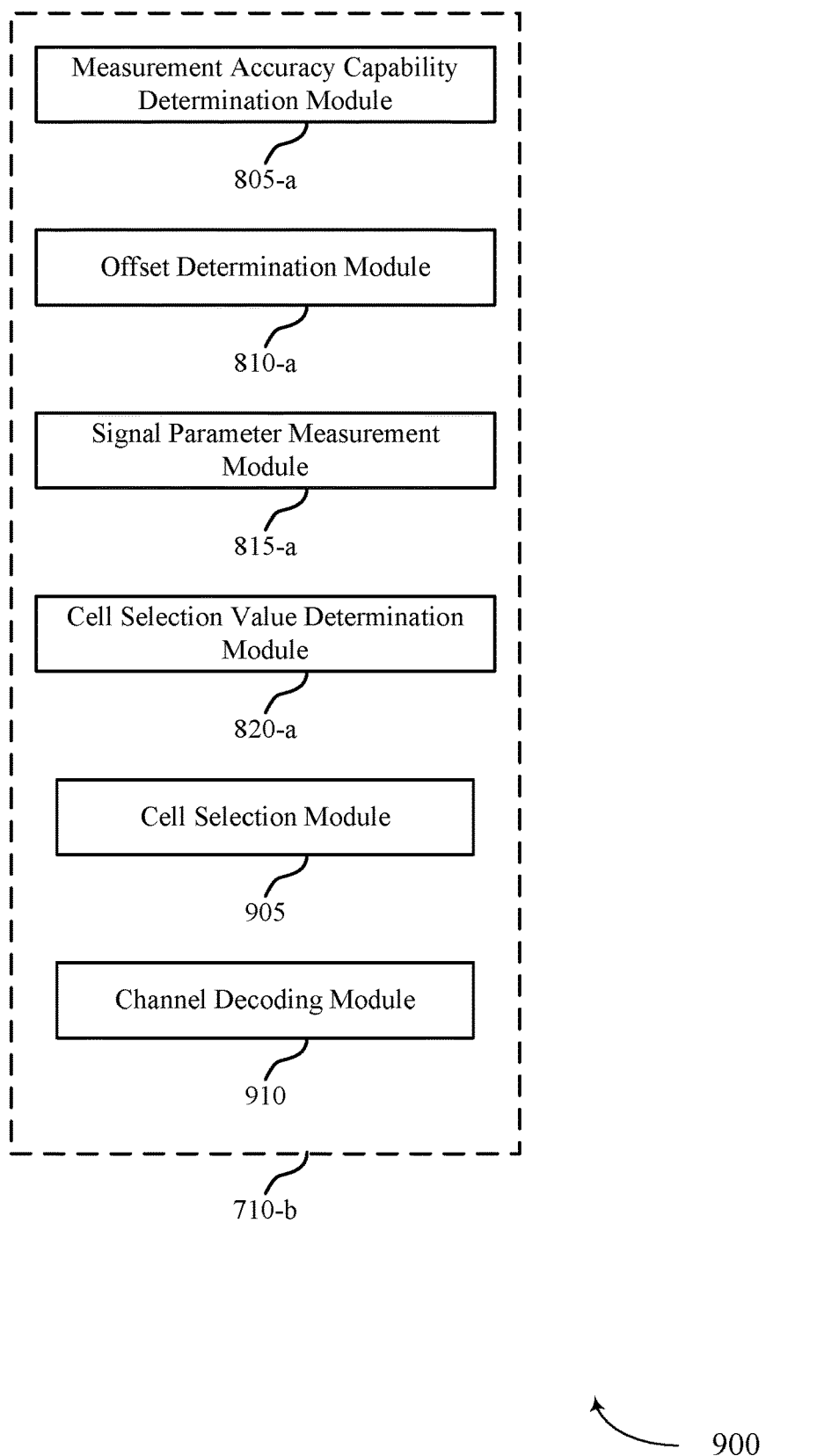

FIG. 9 shows a diagram 900 of a coverage enhancement module 710-b which may be a component of a wireless device 700 or a wireless device 800 for cell selection procedures for MTC in accordance with various aspects of the present disclosure. The coverage enhancement module 710-b may be an example of aspects of a coverage enhancement module 710 described with reference to FIGS. 7-8. The coverage enhancement module 710-b may include a measurement accuracy capability determination module 805-a, an offset determination module 810-a, a signal parameter measurement module 815-a, and a cell selection value determination module 820-a. Each of these modules may perform the functions described with reference to FIG. 8. The coverage enhancement module 710-b may also include a cell selection module 905, and a channel decoding module 910.

The cell selection module 905 may select a cell for attempting access to the wireless communications network based at least in part on the cell selection value for the cells as described with reference to FIGS. 2-6. The cell selection module 905 may also select a first cell of the two or more cells for attempting access to the wireless communications network based at least in part on the cell selection parameter. The cell selection module 905 may also continue to select remaining cells of the two or more cells for attempting access to the wireless communications network according to a predefined criteria. In some examples, the continuing to select remaining cells comprises attempting to decode a broadcast channel transmission of the first cell. The cell selection module 905 may also select a second cell of the two or more cells for attempting access to the wireless communications network based at least in part on unsuccessfully attempting to decode the broadcast channel transmission of the first cell. The cell selection module 905 may also determine an order for selecting the two or more cells for attempting access based at least in part on a receive power level for the two or more cells, wherein the cell selection parameter for the two or more cells comprises the receive power level. In some examples, the selecting the first cell of the two or more cells comprises determining that one or more of the RSRP or RSRQ value of the first cell exceeds the corresponding RSRP or RSRQ value of a second cell. The cell selection module 905 may also select a cell for network access based at least in part on a cell selection parameter comprising the combined coverage enhancement and received power information. In some examples, selecting the cell for network access comprises determining that a cell selection parameter for candidate cells may be less than a threshold value for cell selection. In some examples, selecting the cell for network access comprises continuing to select additional cells for network access according to a predefined criteria. In some examples, continuing to select additional cells comprises attempting to decode a broadcast channel transmission of the cell. The cell selection module 905 may also select a second cell of the neighboring cells for access to the wireless communications network based at least in part on unsuccessfully attempting to decode the broadcast channel transmission of the cell. The cell selection module 905 may also establish a connection with a first cell in the wireless communications network.

The channel decoding module 910 may be configured such that the attempting to decode the broadcast channel transmission of the first cell may include attempting to decode a PBCH and SIB of the first cell as described with reference to FIGS. 2-6. In some examples, the attempting to decode the broadcast channel transmission comprises determining that the first cell has coverage enhancement. The channel decoding module 910 may also attempt to decode the broadcast channel transmission of the first cell with bundling support based at least in part on the determination. The channel decoding module 910 may also determine that a reference signal density for one or more of the neighboring cells is adjusted based at least in part on the coverage enhancement for the associated neighboring cell. The channel decoding module 910 may also adjust a measurement duration associated with the reference signal based at least in part on the reference signal density. In some examples, the reference signal density may be increased as a function of the coverage enhancement. In some examples, the measurement duration associated with the reference signal may be increased as a function of the coverage enhancement. The channel decoding module 910 may also reduce a frequency of measurements of one or more other cells based at least in part on a use of coverage enhancement techniques of one or more of the first cell or the one or more other cells. The offset determination module 810-*a*, in some examples, may receive signaling indicative of a coverage enhancement level for a list of neighbor cells as described with reference to FIGS. 2-6.

Figure 10:
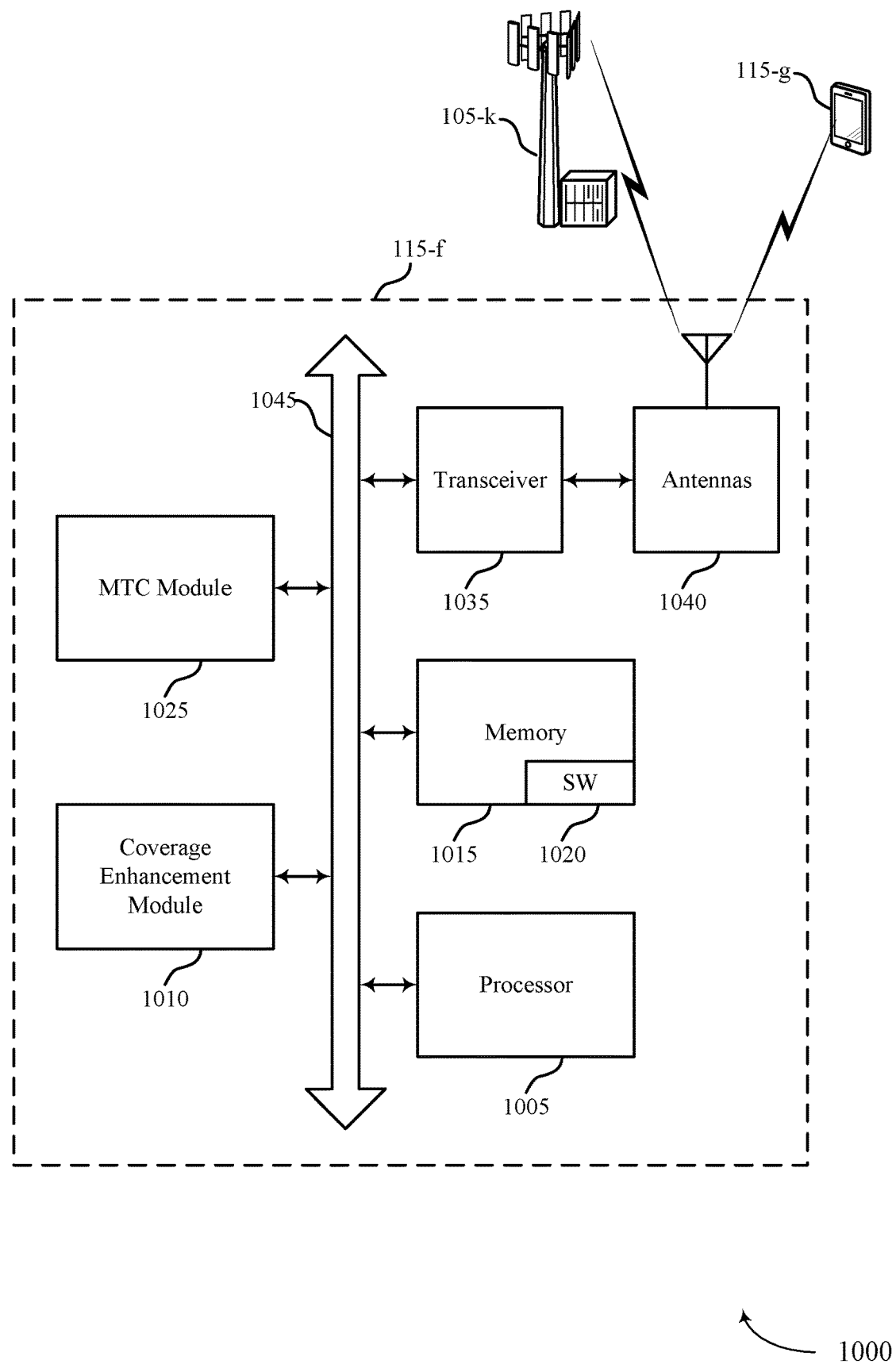
FIG. 10 illustrates a diagram of a system including a device that supports cell selection procedures for MTC in accordance with various aspects of the present disclosure.

FIG. 10 shows a diagram of a system 1000 including a UE 115 configured for cell selection procedures for MTC in accordance with various aspects of the present disclosure. System 1000 may include UE 115-*f,* which may be an example of a wireless device 700, a wireless device 800, or a UE 115 described with reference to FIGS. 1, 2 and 7-9. UE 115-*f* may include a coverage enhancement module 1010, which may be an example of a coverage enhancement module 710 described with reference to FIGS. 7-9. UE 115-*f* may also include a MTC module 1025, which may manage MTC operations. UE 115-*f* may also include components for bi-directional voice and data communications including components for transmitting communications and components for receiving communications. For example, UE 115-*f* may communicate bi-directionally with base station 105-*k* or UE 115-*g*.

UE 115-*f* may also include a processor 1005, and memory 1015 (including software (SW)) 1020, a transceiver 1035, and one or more antenna(s) 1040, each of which may communicate, directly or indirectly, with one another (e.g., via buses 1045). The transceiver 1035 may communicate bi-directionally, via the antenna(s) 1040 or wired or wireless links, with one or more networks, as described above. For example, the transceiver 1035 may communicate bi-directionally with a base station 105 or another UE 115. The transceiver 1035 may include a modem to modulate the packets and provide the modulated packets to the antenna(s) 1040 for transmission, and to demodulate packets received from the antenna(s) 1040. While UE 115-*f* may include a single antenna 1040, UE 115-*f* may also have multiple antennas 1040 capable of concurrently transmitting or receiving multiple wireless transmissions.

The memory 1015 may include random access memory (RAM) and read only memory (ROM). The memory 1015 may store computer-readable, computer-executable software/firmware code 1020 including instructions that, when executed, cause the processor 1005 to perform various functions described herein (e.g., cell selection procedures for MTC, etc.). Alternatively, the software/firmware code 1020 may not be directly executable by the processor 1005 but cause a computer (e.g., when compiled and executed) to perform functions described herein. The processor 1005 may include an intelligent hardware device, (e.g., a central processing unit (CPU), a microcontroller, an application specific integrated circuit (ASIC), etc.)

Figure 11:
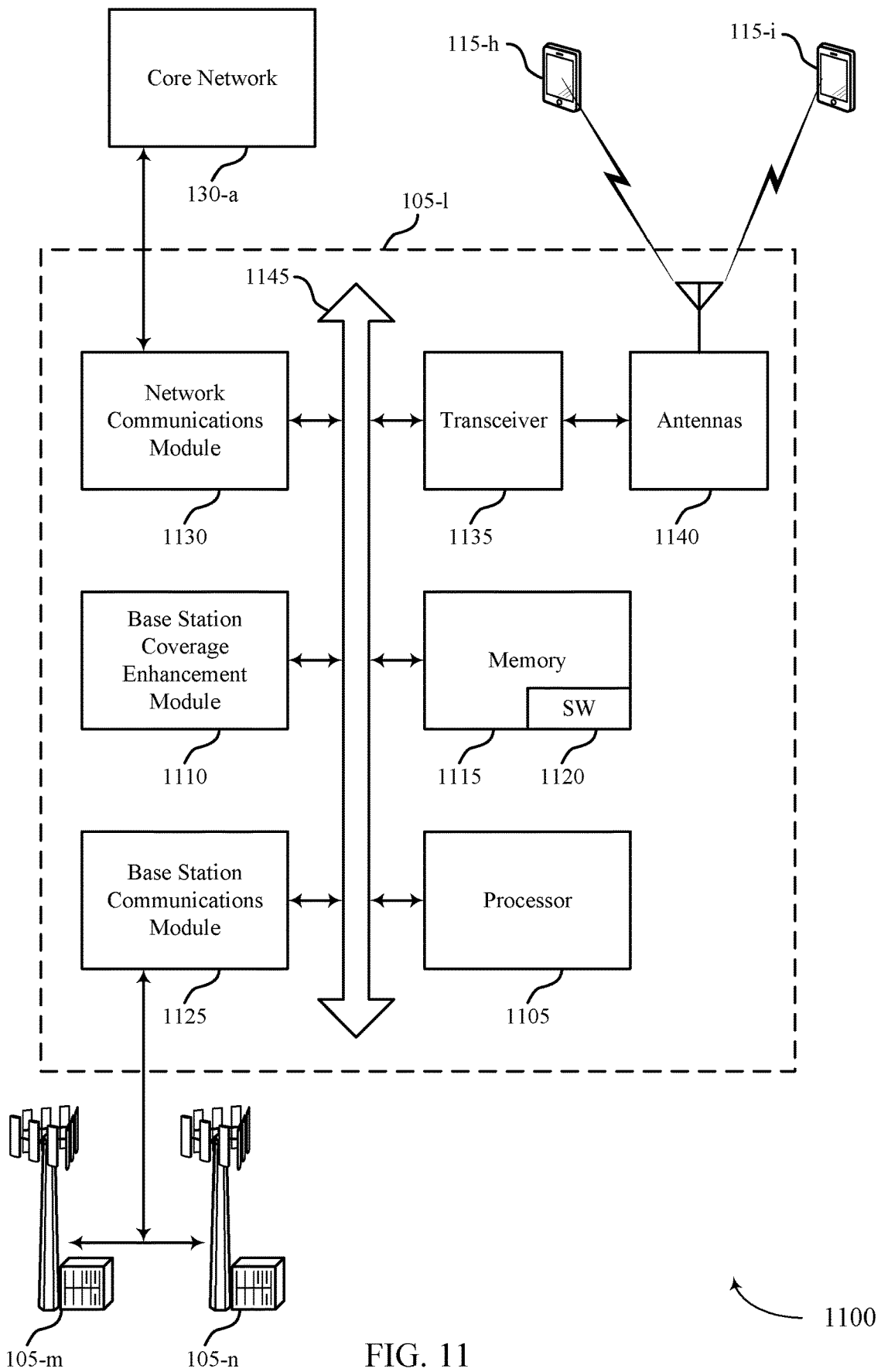
FIG. 11 illustrates a diagram of a system including a base station that supports cell selection procedures for MTC in accordance with various aspects of the present disclosure.

FIG. 11 shows a diagram of a system 1100 including a base station 105 configured for cell selection procedures for MTC in accordance with various aspects of the present disclosure. System 1100 may include base station 105-1, which may be an example a base station 105 described with reference to FIGS. 1-10. Base Station 105-1 may include a base station coverage enhancement module 1110, which may perform base station coverage enhancement such as discussed above with reference to FIGS. 1-10. Base Station 105-1 may also include components for bi-directional voice and data communications including components for transmitting communications and components for receiving communications. For example, base station 105-1 may communicate bi-directionally with UE 115-*h* or UE 115-*i*.

In some cases, base station 105-1 may have one or more wired backhaul links. Base station 105-1 may have a wired backhaul link (e.g., S1 interface, etc.) to the core network 130. Base station 105-1 may also communicate with other base stations 105, such as base station 105-*m* and base station 105-*n* via inter-base station backhaul links (e.g., an X2 interface). Each of the base stations 105 may communicate with UEs 115 using the same or different wireless communications technologies. In some cases, base station 105-1 may communicate with other base stations such as 105-*m* or 105-*n* utilizing base station communications module 1125. In some examples, base station communications module 1125 may provide an X2 interface within a LTE)/LTE-A wireless communication network technology to provide communication between some of the base stations 105. In some examples, base station 105-1 may communicate with other base stations through core network 130. In some cases, base station 105-1 may communicate with the core network 130 through network communications module 1130.

The base station 105-1 may include a processor 1105, memory 1115 (including software (SW) 1120), transceiver 1135, and antenna(s) 1140, which each may be in communication, directly or indirectly, with one another (e.g., over bus system 1145). The transceivers 1135 may be configured to communicate bi-directionally, via the antenna(s) 1140, with the UEs 115, which may be multi-mode devices. The transceiver 1135 (or other components of the base station 105-1) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-1 may include multiple transceivers 1135, each with one or more associated antennas 1140. The transceiver may be an example of a combination of receiver 705 and transmitter 715 of FIG. 7.

The memory 1115 may include RAM and ROM. The memory 1115 may also store computer-readable, computer-executable software code 1120 containing instructions that are configured to, when executed, cause the processor 1105 to perform various functions described herein (e.g., cell selection procedures for MTC, selecting coverage enhancement techniques, call processing, database management, message routing, etc.). Alternatively, the software code 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing modules, base band processors, radio head controllers, digital signal processor (DSPs), and the like.

The base station communications module 1125 may manage communications with other base stations 105. In some cases, a communications management module may include a controller or scheduler for controlling communications with UEs 115 in cooperation with other base stations 105. For example, the base station communications module 1125 may coordinate scheduling for transmissions to UEs 115 for various interference mitigation techniques such as beamforming or joint transmission.

The components of wireless device 700, wireless device 800, and coverage enhancement module 710 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 12:
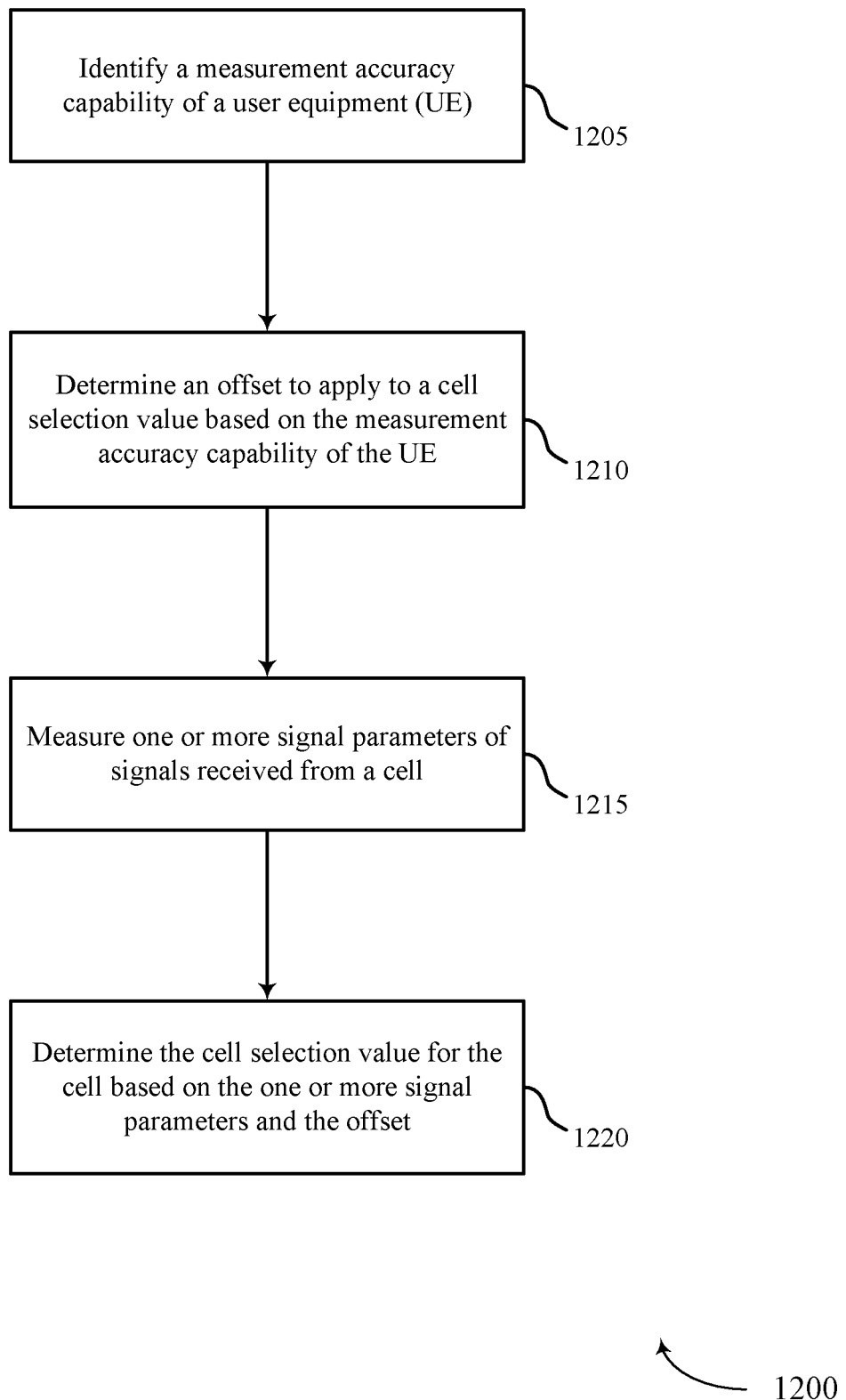
FIGS. 12-15 illustrate flowcharts for methods for cell selection procedures for MTC in accordance with various aspects of the present disclosure.

FIG. 12 shows a flowchart illustrating a method 1200 for cell selection procedures for MTC in accordance with various aspects of the present disclosure. The operations of method 1200 may be implemented by a UE 115 or its components as described with reference to FIGS. 1-11. For example, the operations of method 1200 may be performed by the coverage enhancement module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware.

At block 1205, the UE 115 may identify a measurement accuracy capability of a UE as described with reference to FIGS. 2-6. In certain examples, the operations of block 1205 may be performed by the measurement accuracy capability determination module 805 as described with reference to FIG. 8.

At block 1210, the UE 115 may determine an offset to apply to a cell selection value based at least in part on the measurement accuracy capability of the UE as described with reference to FIGS. 2-6. In certain examples, the operations of block 1210 may be performed by the offset determination module 810 as described with reference to FIG. 8.

At block 1215, the UE 115 may measure one or more signal parameters of signals received from a cell as described with reference to FIGS. 2-6. In certain examples, the operations of block 1215 may be performed by the signal parameter measurement module 815 as described with reference to FIG. 8.

At block 1220, the UE 115 may determine the cell selection value for the cell based at least in part on the one or more signal parameters and the offset as described with reference to FIGS. 2-6. In certain examples, the operations of block 1220 may be performed by the cell selection value determination module 820 as described with reference to FIG. 8.

Figure 13:
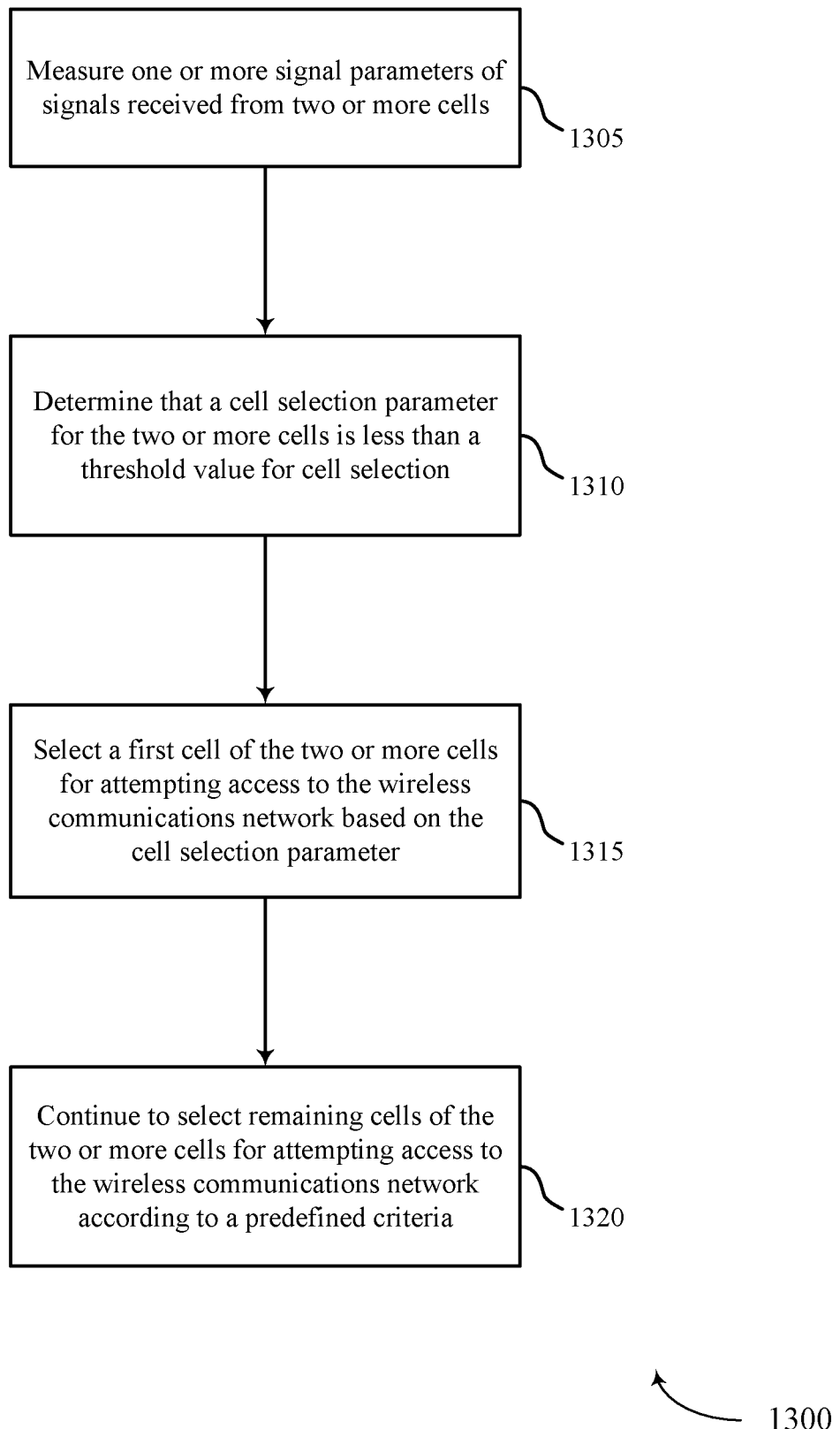

FIG. 13 shows a flowchart illustrating a method 1300 for cell selection procedures for MTC in accordance with various aspects of the present disclosure. The operations of method 1300 may be implemented by a UE 115 or its components as described with reference to FIGS. 1-11. For example, the operations of method 1300 may be performed by the coverage enhancement module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of method 1200 of FIG. 12.

At block 1305, the UE 115 may measure one or more signal parameters of signals received from two or more cells as described with reference to FIGS. 2-6. In certain examples, the operations of block 1305 may be performed by the signal parameter measurement module 815 as described with reference to FIG. 8.

At block 1310, the UE 115 may determine that a cell selection parameter for the two or more cells is less than a threshold value for cell selection as described with reference to FIGS. 2-6. In certain examples, the operations of block 1310 may be performed by the cell selection value determination module 820 as described with reference to FIG. 8.

At block 1315, the UE 115 may select a first cell of the two or more cells for attempting access to the wireless communications network based at least in part on the cell selection parameter as described with reference to FIGS. 2-6. In certain examples, the operations of block 1315 may be performed by the cell selection module 905 as described with reference to FIG. 9.

At block 1320, the UE 115 may continue to select remaining cells of the two or more cells for attempting access to the wireless communications network according to a predefined criteria as described with reference to FIGS. 2-6. In certain examples, the operations of block 1320 may be performed by the cell selection module 905 as described with reference to FIG. 9.

Figure 14:
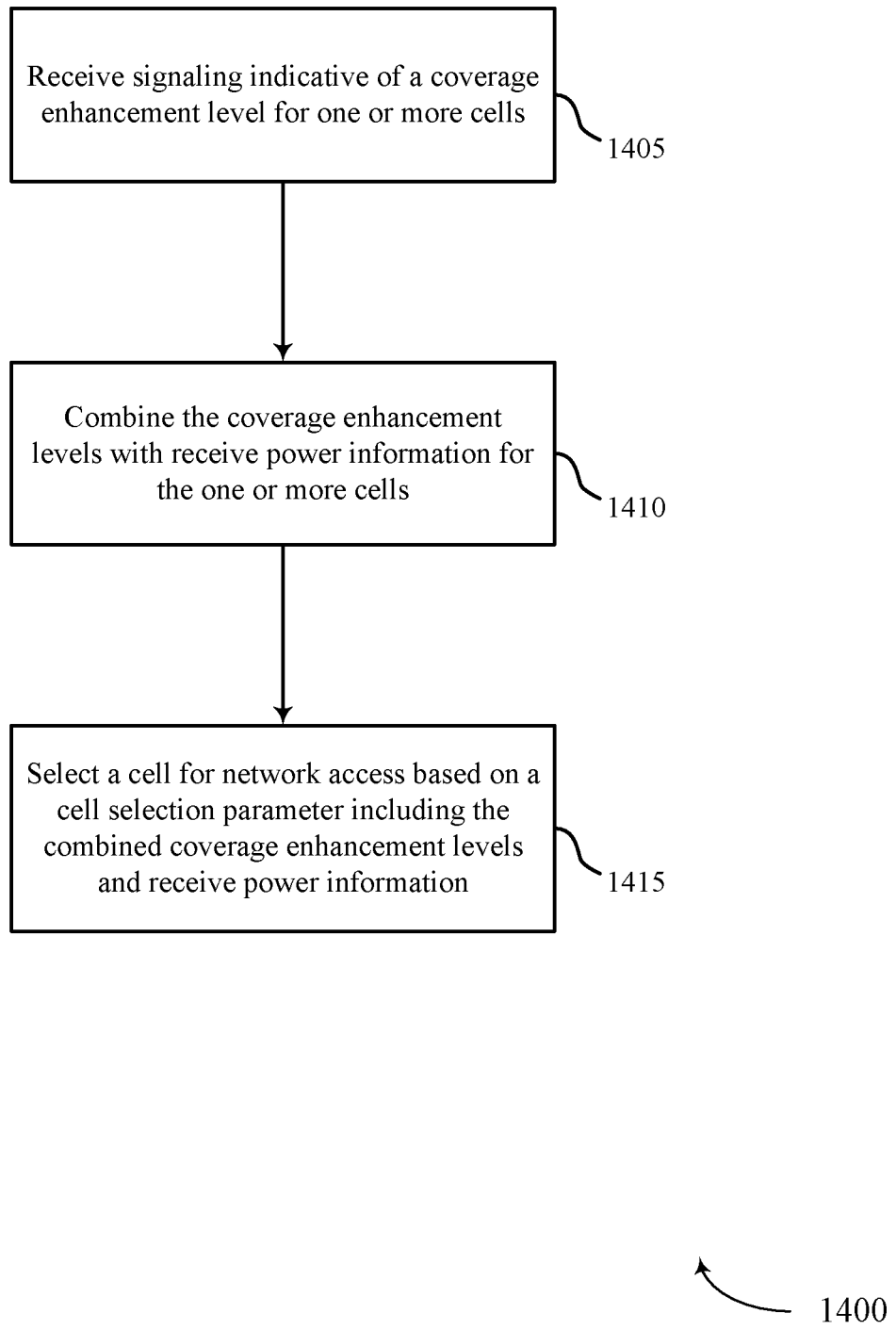

FIG. 14 shows a flowchart illustrating a method 1400 for cell selection procedures for MTC in accordance with various aspects of the present disclosure. The operations of method 1400 may be implemented by a UE 115 or its components as described with reference to FIGS. 1-11. For example, the operations of method 1400 may be performed by the coverage enhancement module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of methods 1200, and 1300 of FIGS. 12-13.

At block 1405, the UE 115 may receive signaling indicative of a coverage enhancement level for one or more cells as described with reference to FIGS. 2-6. In certain examples, the operations of block 1405 may be performed by the cell selection value determination module 820 as described with reference to FIG. 8-9.

At block 1410, the UE 115 may combine the coverage enhancement levels with receive power information for the one or more cells as described with reference to FIGS. 2-6. In certain examples, the operations of block 1410 may be performed by the cell selection value determination module 820 as described with reference to FIG. 8.

At block 1415, the UE 115 may select a cell for network access based at least in part on a cell selection parameter comprising the combined coverage enhancement levels and receive power information as described with reference to FIGS. 2-6. In certain examples, the operations of block 1415 may be performed by the cell selection module 905 as described with reference to FIG. 9.

Figure 15:
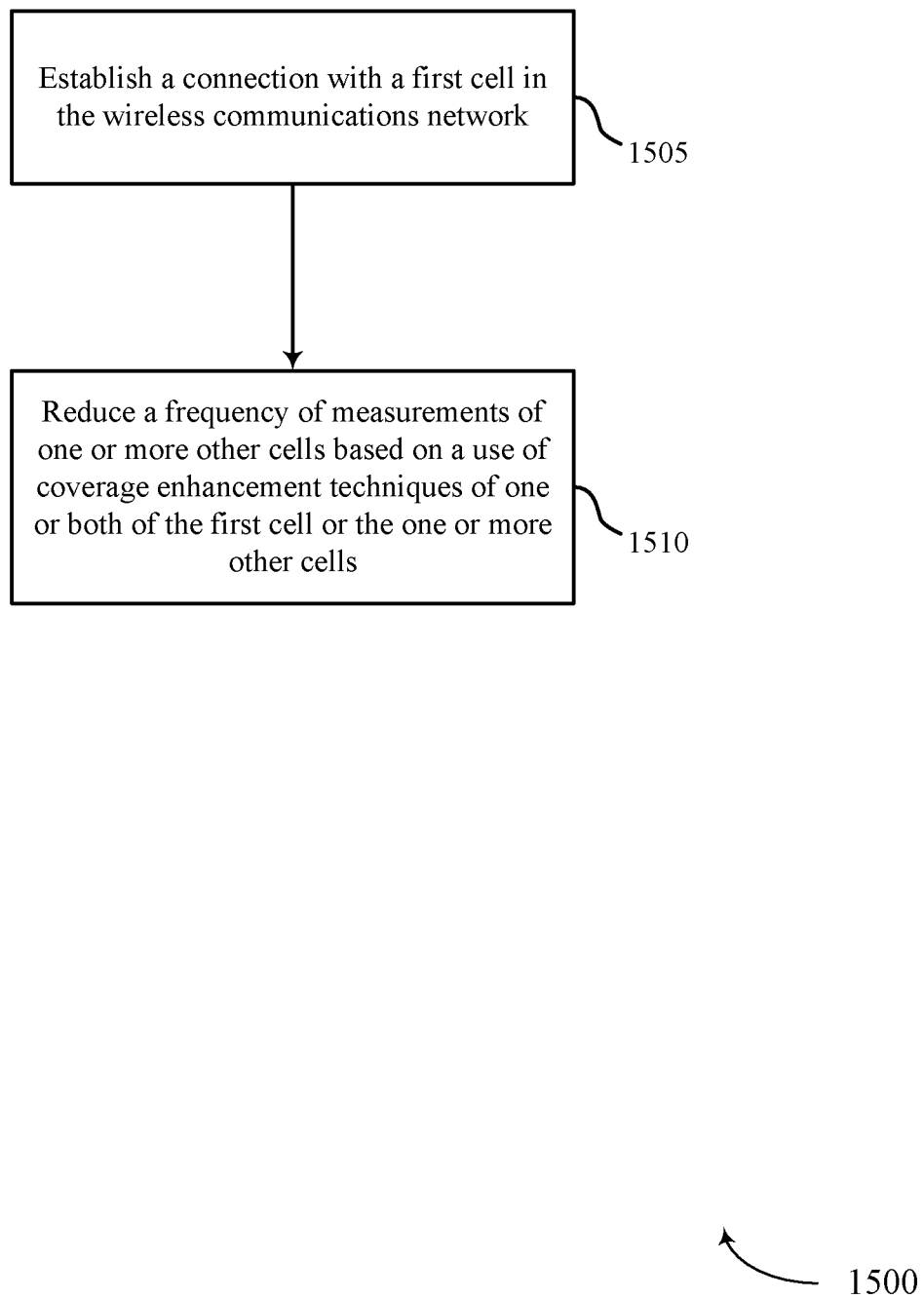

FIG. 15 shows a flowchart illustrating a method 1500 for cell selection procedure for MTC in accordance with various aspects of the present disclosure. The operations of method 1500 may be implemented by a UE 115 or its components as described with reference to FIGS. 1-11. For example, the operations of method 1500 may be performed by the coverage enhancement module 710 as described with reference to FIGS. 7-10. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1200, 1300, and 1400 of FIGS. 12-14.

At block 1505, the UE 115 may establish a connection with a first cell in the wireless communications network as described with reference to FIGS. 2-6. In certain examples, the operations of block 1505 may be performed by the cell selection module 905 as described with reference to FIG. 9.

At block 1510, the UE 115 may reduce a frequency of measurements of one or more other cells based at least in part on a use of coverage enhancement techniques of one or both of the first cell or the one or more other cells as described with reference to FIGS. 2-6. In certain examples, the operations of block 1510 may be performed by the channel decoding module 910 as described with reference to FIG. 9.

Thus, methods 1200, 1300, 1400, and 1500 may provide for cell selection procedure for MTC. It should be noted that methods 1200, 1300, 1400, and 1500 describe possible implementation, and that the operations and the steps may be rearranged or otherwise modified such that other implementations are possible. In some examples, aspects from two or more of the methods 1200, 1300, 1400, and 1500 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of UMTS that use E-UTRA. UTRA, E-UTRA, UMTS, LTE, LTE-A and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication in a wireless communications network, comprising:
    identifying that a first cell supports coverage enhancement;
    modifying a cell selection criterion based at least in part on the first cell supporting coverage enhancement;
    adjusting when to perform a cell re-selection measurement of one or more other cells based at least in part on the modified cell selection criterion; and
    performing the cell re-selection measurement based at least in part on the adjusting.

2. The method of claim 1, wherein adjusting when to perform the cell re-selection measurement further comprises:
    determining to perform the cell re-selection measurement based at least in part on determining that the modified cell selection criterion is not satisfied.

3. The method of claim 1, wherein modifying the cell selection criterion based at least in part on the first cell supporting coverage enhancement comprises:
    determining an offset to apply to cell selection values for one or more cells based at least in part on a coverage enhancement level for the one or more cells.

4. The method of claim 1, wherein the cell selection criterion is based at least in part on one or both of a reference signal received power (RSRP) measurement or a reference signal received quality (RSRQ) measurement.

5. The method of claim 1, further comprising:
    selecting a cell for network access based at least in part on the cell re-selection measurement and the cell selection criterion.

6. The method of claim 1, further comprising:
    establishing a connection with the first cell in the wireless communications network; and
    wherein adjusting when to perform the cell re-selection measurement comprises reducing a frequency of measurements of the one or more other cells based at least in part on a use of coverage enhancement techniques of one or both of the first cell or the one or more other cells.

7. The method of claim 6, further comprising:
    measuring one or more signal parameters of signals received from the one or more other cells according to the reduced frequency of measurements; and
    determining whether to attempt to establish a connection with a second cell of the one or more other cells based at least in part on the measured signal parameters for the second cell and a coverage enhancement level associated with one or both of the first cell or the second cell.

8. The method of claim 6, wherein reducing the frequency of measurements comprises:
    identifying a coverage enhancement level associated with the first cell, wherein modifying the cell selection criterion is based at least in part on the coverage enhancement level; and
    configuring a timer to control the frequency of measurements of signals received from the one or more other cells having at least partially overlapping frequencies based at least in part on the modified cell selection criterion.

9. The method of claim 6, wherein reducing the frequency of measurements comprises:
    identifying a coverage enhancement level associated with the first cell;
    identifying one or more of the other cells having non-overlapping frequencies with the first cell; and
    adjusting the frequency of measurements for one or more of the other cells based at least in part on a priority associated with the non-overlapping frequencies of the one or more other cells.

10. The method of claim 9, wherein measurements for one or more of the other cells having a higher priority frequency are performed based at least in part on one or both of a timer or a quality threshold of the first cell.

11. The method of claim 9, wherein measurements for one or more of the other cells having a lower priority frequency are performed based at least in part on one or both of a timer or an offset to the cell selection criterion.

12. An apparatus for wireless communication in a wireless communications network, comprising:
    a processor;
    memory in communication with the processor; and
    instructions stored in the memory and operable, when executed by the processor, to cause the apparatus to:
        identify that a first cell supports coverage enhancement;
        modify a cell selection criterion based at least in part on the first cell supporting coverage enhancement;
        adjust when to perform a cell re-selection measurement of one or more other cells based at least in part on the modified cell selection criterion; and
        perform the cell re-selection measurement based at least in part on the adjusting.

13. The apparatus of claim 12, wherein the instructions are further executable to cause the apparatus to:
    adjust when to perform the cell re-selection measurement by determining to perform the cell re-selection measurement based at least in part on determining that the modified cell selection criterion is not satisfied.

14. The apparatus of claim 12, wherein the instructions are further executable to cause the apparatus to:
modify the cell selection criterion based at least in part on the first cell supporting coverage enhancement by determining an offset to apply to cell selection values for one or more cells based at least in part on a coverage enhancement level for the one or more cells.

15. The apparatus of claim 12, wherein the cell selection criterion is based at least in part on one or both of a reference signal received power (RSRP) measurement or a reference signal received quality (RSRQ) measurement.

16. The apparatus of claim 12, wherein the instructions are further executable to cause the apparatus to:
select a cell for network access based at least in part on the cell re-selection measurement and the cell selection criterion.

17. The apparatus of claim 12, wherein the instructions are further executable to cause the apparatus to:
establish a connection with the first cell in the wireless communications network; and
adjust when to perform the cell re-selection measurement by reducing a frequency of measurements of the one or more other cells based at least in part on a use of coverage enhancement techniques of one or both of the first cell or the one or more other cells.

18. The apparatus of claim 17, wherein the instructions are further executable to cause the apparatus to:
measure one or more signal parameters of signals received from the one or more other cells according to the reduced frequency of measurements; and
determine whether to attempt to establish a connection with a second cell of the one or more other cells based at least in part on the measured signal parameters for the second cell and a coverage enhancement level associated with one or both of the first cell or the second cell.

19. The apparatus of claim 17, wherein the instructions to reduce the frequency of measurements are further executable to cause the apparatus to:
identify a coverage enhancement level associated with the first cell, wherein modifying the cell selection criterion is based at least in part on the coverage enhancement level; and
configure a timer to control the frequency of measurements of signals received from the one or more other cells having at least partially overlapping frequencies based at least in part on the modified cell selection criterion.

20. The apparatus of claim 17, wherein the instructions to reduce the frequency of measurements are further executable to cause the apparatus to:
identify a coverage enhancement level associated with the first cell;
identify one or more of the other cells having non-overlapping frequencies with the first cell; and
adjust the frequency of measurements for one or more of the other cells based at least in part on a priority associated with the non-overlapping frequencies of the one or more other cells.

21. The apparatus of claim 20, wherein the instructions are further executable to cause the apparatus to:
perform measurements for one or more of the other cells having a higher priority frequency based at least in part on one or both of a timer or a quality threshold of the first cell the cell.

22. The apparatus of claim 20, wherein the instructions are further executable to cause the apparatus to:
perform measurements for one or more of the other cells having a lower priority frequency based at least in part on one or both of a timer or an offset to the cell selection criterion.

23. A user equipment (UE) for wireless communication in a wireless communications network, comprising:
UE means for identifying that a first cell supports coverage enhancement;
UE means for modifying a cell selection criterion based at least in part on the first cell supporting coverage enhancement;
UE means for adjusting when to perform a cell re-selection measurement of one or more other cells based at least in part on the modified cell selection criterion; and
UE means for performing the cell re-selection measurement based at least in part on the adjusting.

24. The UE of claim 23, wherein the UE means for adjusting when to perform the cell re-selection measurement comprises:
UE means for determining to perform the cell re-selection measurement based at least in part on determining that the modified cell selection criterion is not satisfied.

25. The UE of claim 23, wherein the UE means for modifying the cell selection criterion based at least in part on the first cell supporting coverage enhancement comprises:
UE means for determining an offset to apply to cell selection values for one or more cells based at least in part on a coverage enhancement level for the one or more cells.

26. The UE of claim 23, wherein the cell selection criterion is based at least in part on one or both of a reference signal received power (RSRP) measurement or a reference signal received quality (RSRQ) measurement.

27. The UE of claim 23, further comprising:
UE means for selecting a cell for network access based at least in part on the cell re-selection measurement and the cell selection criterion.

28. The UE of claim 23, further comprising:
UE means for establishing a connection with the first cell in the wireless communications network; and
wherein the UE means for adjusting when to perform the cell re-selection measurement comprises UE means for reducing a frequency of measurements of the one or more other cells based at least in part on a use of coverage enhancement techniques of one or both of the first cell or the one or more other cells.

29. The UE of claim 28, further comprising:
UE means for measuring one or more signal parameters of signals received from the one or more other cells according to the reduced frequency of measurements; and
UE means for determining whether to attempt to establish a connection with a second cell of the one or more other cells based at least in part on the measured signal parameters for the second cell and a coverage enhancement level associated with one or both of the first cell or the second cell.

30. The UE of claim 28, wherein the UE means for reducing the frequency of measurements comprises:
UE means for identifying a coverage enhancement level associated with the first cell, wherein the means for modifying the cell selection criterion is based at least in part on the coverage enhancement level; and UE means for configuring a timer to control the frequency of measurements of signals received from the one or more other cells having at least partially overlapping frequencies based at least in part on the modified cell selection criterion.

31. The UE of claim 28, wherein the UE means for reducing the frequency of measurements comprises:
UE means for identifying a coverage enhancement level associated with the first cell;
UE means for identifying one or more of the other cells having non-overlapping frequencies with the first cell; and
UE means for adjusting the frequency of measurements for one or more of the other cells based at least in part on a priority associated with the non-overlapping frequencies of the one or more other cells.

32. The UE of claim 31, wherein measurements for one or more of the other cells having a higher priority frequency are performed based at least in part on one or both of a timer or a quality threshold of the first cell.

33. The UE of claim 31, wherein measurements for one or more of the other cells having a lower priority frequency are performed based at least in part on one or both of a timer or an offset to the cell selection criterion.

34. A non-transitory computer-readable medium comprising computer-readable code that, when executed, causes a device to:
identify that a first cell supports coverage enhancement;
modify a cell selection criterion based at least in part on the first cell supporting coverage enhancement;
adjust when to perform a cell re-selection measurement of one or more other cells based at least in part on the modified cell selection criterion; and
perform the cell re-selection measurement based at least in part on the adjusting.

* * * * *